US010917539B2

(12) United States Patent
Dolev

(10) Patent No.: US 10,917,539 B2
(45) Date of Patent: Feb. 9, 2021

(54) APPARATUS AND METHODS FOR COMPUTERIZED AUTHENTICATION OF ELECTRONIC DOCUMENTS

(71) Applicant: Au10tix Ltd., Hod Hasharon (IL)

(72) Inventor: Guy Dolev, Herzliya (IL)

(73) Assignee: AU10TIX LTD., Hod Hasharon (IL)

( * ) Notice: Subject to any disclaimer, the term of this patent is extended or adjusted under 35 U.S.C. 154(b) by 0 days.

(21) Appl. No.: 16/552,308

(22) Filed: Aug. 27, 2019

(65) Prior Publication Data

US 2019/0387122 A1 Dec. 19, 2019

Related U.S. Application Data

(63) Continuation of application No. 15/467,540, filed on Mar. 23, 2017, now Pat. No. 10,440,219, which is a (Continued)

(30) Foreign Application Priority Data

Nov. 10, 2009 (IL) .......................................... 202028

(51) Int. Cl.
H04N 1/00 (2006.01)
H04N 1/32 (2006.01)
(Continued)

(52) U.S. Cl.
CPC ..... *H04N 1/32133* (2013.01); *G06F 16/2365* (2019.01); *G06F 16/24578* (2019.01); *G06F 16/93* (2019.01); *G06F 21/64* (2013.01); *G06K 9/00469* (2013.01); *G06K 9/2018* (2013.01); *G06K 9/344* (2013.01); *G06K 9/4652* (2013.01); *G07D 7/2008* (2013.01); *H04N 1/32128* (2013.01); *H04N 1/32267* (2013.01);
(Continued)

(58) Field of Classification Search
CPC ... H04N 2201/3233; H04N 2201/3269; H04N 2201/0081; H04N 1/32133; H04N 1/32267; H04N 1/32128; G07D 7/2008; G06K 9/2018; G06K 2209/01; G06K 9/4652; G06K 9/00469; G06K 9/344; G06F 21/64; G06F 16/2365; G06F 16/24578
USPC ....................................................... 358/1.14
See application file for complete search history.

(56) References Cited

U.S. PATENT DOCUMENTS 5,729,623 A 3/1998 Omatu et al.
5,912,974 A 6/1999 Holloway et al.
(Continued)

FOREIGN PATENT DOCUMENTS

EP 0981806 A1 3/2000
EP 1473657 A1 11/2004
(Continued)

OTHER PUBLICATIONS

Sagem Portal, <www.sagem.com>.
(Continued)

*Primary Examiner* — Mohammad H Ghayour
(74) *Attorney, Agent, or Firm* — Oliff PLC

(57) ABSTRACT

A computerized method for authenticating documents having VIZ sections, the method comprising capturing an image of a document to be authenticated from a scanner and enhancing the captured image, and using a processor for identifying and cropping a VIZ section in the image.

20 Claims, 32 Drawing Sheets

Related U.S. Application Data continuation of application No. 14/734,398, filed on Jun. 9, 2015, now Pat. No. 9,628,661, which is a continuation of application No. 13/509,169, filed as application No. PCT/IL2010/000932 on Nov. 10, 2010, now Pat. No. 9,081,988.

(51) Int. Cl.

| | | |
|---|---|---|
| *G06F 16/93* | (2019.01) | |
| *G06F 16/23* | (2019.01) | |
| *G06F 16/2457* | (2019.01) | |
| *G06K 9/00* | (2006.01) | |
| *G06K 9/20* | (2006.01) | |
| *G06K 9/34* | (2006.01) | |
| *G07D 7/20* | (2016.01) | |
| *G06F 21/64* | (2013.01) | |
| *G06K 9/46* | (2006.01) | |

(52) U.S. Cl.
CPC . *G06K 2209/01* (2013.01); *H04N 2201/0081* (2013.01); *H04N 2201/3233* (2013.01); *H04N 2201/3269* (2013.01)

(56) References Cited

U.S. PATENT DOCUMENTS

| | | | |
|---|---|---|---|
| 6,141,438 A | 10/2000 | Blanchester | |
| 6,401,079 B1 | 6/2002 | Kahn et al. | |
| 6,621,916 B1 | 9/2003 | Smith et al. | |
| 7,366,339 B2 | 4/2008 | Douglas et al. | |
| 8,848,971 B2 * | 9/2014 | Vincent | G09F 3/0341 382/100 |
| 9,782,995 B2 * | 10/2017 | Pflughoefft | B42D 25/36 |
| 2003/0023557 A1 | 1/2003 | Moore | |
| 2003/0138128 A1 | 7/2003 | Rhoads | |
| 2003/0188659 A1 | 10/2003 | Merry et al. | |
| 2004/0081332 A1 | 4/2004 | Tuttle et al. | |
| 2004/0139059 A1 | 7/2004 | Conroy et al. | |
| 2004/0172378 A1 | 9/2004 | Shanahan et al. | |
| 2004/0225545 A1 | 11/2004 | Turner et al. | |
| 2004/0237047 A1 | 11/2004 | Houle et al. | |
| 2004/0243516 A1 | 12/2004 | Zinssmeister et al. | |
| 2004/0267586 A1 | 12/2004 | McDougal et al. | |
| 2005/0049977 A1 | 3/2005 | Suisa | |
| 2005/0068463 A1 | 3/2005 | Feng et al. | |
| 2005/0071743 A1 | 3/2005 | Harrington et al. | |
| 2005/0226261 A1 | 10/2005 | Varadarajan et al. | |
| 2005/0229010 A1 | 10/2005 | Monk et al. | |
| 2005/0234857 A1 | 10/2005 | Plutchak et al. | |
| 2006/0000901 A1 | 1/2006 | Haddad | |
| 2006/0015428 A1 | 1/2006 | Friedman | |
| 2006/0157559 A1 * | 7/2006 | Levy | G06Q 20/40145 235/380 |
| 2006/0202038 A1 | 9/2006 | Wang et al. | |
| 2007/0172094 A1 | 7/2007 | Ho et al. | |
| 2007/0244782 A1 | 10/2007 | Chimento | |
| 2008/0162603 A1 | 7/2008 | Garg et al. | |
| 2008/0317280 A1 | 12/2008 | Silverbrook et al. | |
| 2009/0154778 A1 | 6/2009 | Lei et al. | |

FOREIGN PATENT DOCUMENTS

| | | |
|---|---|---|
| GB | 2059129 A | 4/1981 |
| GB | 2454821 A | 5/2009 |

OTHER PUBLICATIONS

United Technologies, <http://www.gesecurity.com>.
Tata Group <www.tata.com>.
"Experian and I-SEC Partner to Offer Advanced Document Checking Service, "Experian Decision Analytics e-news, Oct. 2009, Experian <http://experian-da.com/news/enews_0909/Isec_partnership.html>.
U.S. Appl. No. 13/509,200, filed May 10, 2012 in the name of Guy Dolev.
May 6, 2016 Office Action Issued in U.S. Appl. No. 14/734,398.
Aug. 10, 2017 Office Action Issued in U.S. Appl. No. 15/467,540.
Dec. 28, 2017 Office Action issued in U.S. Appl. No. 15/467,540.
Jun. 14, 2018 Office Action Issued in U.S. Appl. No. 15/467,540.
Dec. 28, 2018 Office Action issued in U.S. Appl. No. 15/467,540.

* cited by examiner

| Functionality | Usability | Requirements |
|---|---|---|
| Dithering Checking | Fast checking of dithered printing on small document areas | • High resolution scanner (1200 dpi)<br>• Any kind of travel document |
| Pattern Dispersion | Recognition of security patterns, regardless of rotation of translation | • Normal to high resolution scanner (600 dpi or more)<br>• Location of known patterns in the document |
| Printing Continuity | Recognition of non-Offset printing | • All kinds of scanners<br>• The travel document must contain known security elements drawn with lines |

Fig. 32

APPARATUS AND METHODS FOR COMPUTERIZED AUTHENTICATION OF ELECTRONIC DOCUMENTS

REFERENCE TO CO-PENDING APPLICATIONS

This is a Continuation of application Ser. No. 15/467,540 filed Mar. 23, 2017, which in turn is a Continuation of application Ser. No. 14/734,398 filed Jun. 9, 2015, which is a Continuation of application Ser. No. 13/509,169 filed May 10, 2012, now U.S. Pat. No. 9,081,988, which priority is claimed from Israel patent application No. 202028 entitled Apparatus and Methods for Computerized Authentication of Electronic Documents and filed 10 Nov. 2009.

Israel patent application No. 202029 entitled "Computerized Integrated Authentication/Document Bearer Verification System And Methods Useful In Conjunction Therewith" filed 11 Nov. 2009, and a corresponding PCT application filed today, are co-pending.

FIELD OF THE INVENTION

The present invention relates generally to computerized analysis of documents and more particularly to computerized fraud detection.

BACKGROUND OF THE INVENTION

The state of the art includes the following publications:

| | |
|---|---|
| U.S. Pat. No. 6,621,916 B1 | (SMITH et al.) |
| GB 2059129 A | (SODECO) |
| GB 2454821 A | (CANADIAN BANK NOTE) |
| EP 1473657 A1 | (SICPA HOLDING) |
| EP 0981806 A1 | (CUMMINS-ALLISON) |
| U.S. Pat. No. 5,729,623 A | (OMATU et al.) |

The disclosures of all publications and patent documents mentioned in the specification, and of the publications and patent documents cited therein directly or indirectly, are hereby incorporated by reference.

SUMMARY OF THE INVENTION

Certain embodiments of the present invention seek to provide improved apparatus and methods for computerized analysis of documents.

Certain embodiments of the present invention seek to provide improved apparatus and methods for computerized fraud detection.

There is thus provided, in accordance with at least one embodiment of the present invention, a computerized method for authenticating documents having VIZ sections, the method comprising capturing an image of a document to be authenticated from a scanner and enhancing the captured image; and identifying and cropping a VIZ section in the image.

Further in accordance with at least one embodiment of the present invention, the method also comprises binarization for optimizing OCR readability; definition of fields for OCR operation; and identification and reading of at least one heading of at least one of the fields.

Still further in accordance with at least one embodiment of the present invention, the method also comprises optimization of OCR according to templates.

Additionally in accordance with at least one embodiment of the present invention, the method also comprises at least one of final information identification, error correction and output control.

Also provided, in accordance with at least one embodiment of the present invention, is a computerized document processing method for analyzing electronic documents, the method comprising analyzing a binary characteristic, having two possible values, for each electronic document; and selecting one of the two possible values for at least some of the electronic documents.

In contrast, conventional systems generate a summary for each electronic document representing an analysis thereof vis a vis the binary characteristic, and do not utilize the analysis to come to a decision regarding the correct value for the binary characteristic of any individual document.

Further in accordance with at least one embodiment of the present invention, the binary characteristic comprises an authenticity characteristic and wherein the two possible values represent an indication that a document is authentic and forged, respectively.

Still further in accordance with at least one embodiment of the present invention, the binary characteristic comprises a document compliance characteristic and the two possible values represent an indication that a document bearer is compliant with regulations and non-compliant with regulations, respectively.

Additionally in accordance with at least one embodiment of the present invention, the method also comprises generating an output other than the two possible values for at least some of the electronic documents.

Further in accordance with at least one embodiment of the present invention, the output comprises a conditional ok.

Also provided, in accordance with at least one embodiment of the present invention, is a computerized document processing system for analyzing incoming electronic documents, the system comprising a first sub-system for checking at least one of the following for each of the incoming documents: integrity of document materials; integrity of document markings; and consistency of data within document; a database of documents; and a document-database consistency analyzer operative to ascertain consistency of incoming documents vis a vis the database.

Also provided, in accordance with at least one embodiment of the present invention, is a computerized document processing system for analyzing incoming electronic documents, the system comprising a first sub-system for checking at least one of the following for each of the incoming documents: integrity of document materials; integrity of document markings; and consistency of data within document.

Also provided, in accordance with at least one embodiment of the present invention, is a computerized document processing system for analyzing authenticity of incoming electronic documents, the system comprising a working day database storing information indicating dates which are not working days; an issue date finder operative to find an issue date within an electronic document; and an issue date checker operative to generate an indication as to whether the issue date found by the finder is indicated by the working day database to be a workday.

Further in accordance with at least one embodiment of the present invention, the working day database includes per-country information, the system also comprising a country identifier operative to identify a country which issued an individual incoming electronic document and wherein the issue date checker uses per-country information which corresponds to the country as identified by the country identifier.

Also provided, in accordance with at least one embodiment of the present invention, is a computerized document processing method for establishing identity authentication for incoming electronic documents, the method comprising determining the authenticity of a document based on parameters extracted from the document, including providing a plurality of parameters characterizing the document and comparing each individual parameter from among the plurality of parameters to a corresponding plurality of known values thereby to generate a corresponding plurality of comparison results; assigning a plurality of weights to the plurality of comparison results respectively, at least one individual weight from among the plurality of weights being based on the weight's corresponding parameter's cumulative success at distinguishing authentic documents from non-authentic documents; and generating an authenticity determination by computing a weighted combination of the plurality of comparison results using the plurality of weights.

Further in accordance with at least one embodiment of the present invention, the parameters represent at least one of visual characteristics, content characteristics and physical characteristics of the document.

Still further in accordance with at least one embodiment of the present invention, the providing a plurality of parameters includes at least one of the following: computing at least one parameter internally; extracting at least one parameter from the document; receiving at least one parameter computed in an external system; and receiving at least one manually entered parameter.

Also provided, in accordance with at least one embodiment of the present invention, is a computerized document processing system for analyzing incoming multi-level electronic documents, the system comprising a binarization functionality operative to generate binarized representations of incoming multi-level electronic documents by applying a set of at least one binarization thresholds to the multi-level electronic documents; and a learning subsystem operative to accumulate experience and to dynamically change the binarization thresholds based on the experience.

Further in accordance with at least one embodiment of the present invention, the system also comprises a document analyzer operative to process the binarized representations in order to generate document analysis results and wherein the learning subsystem conducts an evaluation of the document analysis results as a function of the binarization thresholds and dynamically changes the thresholds based on the evaluation.

Still further in accordance with at least one embodiment of the present invention, the document analysis results include indications distinguishing known authentic documents from known non-authentic documents.

Also provided, in accordance with at least one embodiment of the present invention, is a computerized document processing method for analyzing incoming multi-level electronic documents, the method comprising analyzing the incoming documents including binarizing the documents using a set of binarization thresholds and computing a weighted combination of parameters characterizing the document, the weighted combination defining a set of weights; and at least one of the sets is at least partly determined dynamically as a function of the system's changing state of knowledge including knowledge regarding changes in tolerances of processes used to produce the documents.

Also provided, in accordance with at least one embodiment of the present invention, is a computerized document processing system for analyzing incoming electronic documents, the system comprising a database storing a plurality of templates each corresponding to an individual series of an individual type of document in an individual country; and apparatus for maintaining the database including a matcher operative to identify incoming documents which do not match any of the plurality of templates, to generate a new template in the database, each time an incoming document is found not to match any of the plurality of templates and, for each individual template from among the plurality of templates, to statistically analyze those incoming documents which match the individual template and to update the individual template accordingly.

Further in accordance with at least one embodiment of the present invention, the matcher identifies incoming documents which do not match any of the plurality of templates by using initial tolerance values to identify a population of incoming documents matching an individual template, statistically analyzing that population of incoming documents which matches the individual template including estimating the variation of that population for at least one document parameter, and modifying the initial tolerance values to reflect the variation.

Yet further provided, in accordance with at least one embodiment of the present invention, is a computerized document processing system for analyzing incoming electronic documents, having VIZ and MRZ zones, the system comprising apparatus for comparing data in the VIZ with data in the MRZ and to evaluate consistency accordingly.

Also provided, in accordance with at least one embodiment of the present invention, is a computerized document processing system for analyzing incoming electronic documents, having VIZ and MRZ zones, the system comprising apparatus for supplying images of an incoming document in a plurality of scanned illuminations as well as a photo image from visible illumination, wherein each image is supplied immediately after a certain illumination has been scanned and even before all illuminations are completed.

Further in accordance with at least one embodiment of the present invention, the system also comprises document recognition apparatus generating document recognition results generated step by step as the scanned illuminations become available, thereby to define a sequence of partial results, and the recognition apparatus is operative to supply the partial results before the document has been completely scanned.

Still further in accordance with at least one embodiment of the present invention, when complete document recognition results have been generated, a special event is fired so as to enable a host application to access the complete results.

Also provided, in accordance with at least one embodiment of the present invention, is a method for identifying fraudulent documents, the method including providing a scanned document; and analyzing the scanned document in order to determine whether dithering is present in the scanned document.

Further in accordance with at least one embodiment of the present invention, analyzing comprises computing a maximum dispersion of color values of pixels in a selected area of the scanned document, and comparing the maximum dispersion to an expected value therefor.

Still further in accordance with at least one embodiment of the present invention, the method also comprises analyzing the captured image in order to determine whether dithering is present.

Additionally in accordance with at least one embodiment of the present invention, the system comprises a working day database storing information indicating dates which are not working days; an issue date finder operative to find an issue date within an electronic document; and an issue date checker operative to generate an indication as to whether the issue date found by the finder is indicated by the working day database to be a workday.

Further in accordance with at least one embodiment of the present invention, the analyzing and selecting comprises determining the authenticity of a document based on parameters extracted from the document, including providing a plurality of parameters characterizing the document and comparing each individual parameter from among the plurality of parameters to a corresponding plurality of known values thereby to generate a corresponding plurality of comparison results; assigning a plurality of weights to the plurality of comparison results respectively, at least one individual weight from among the plurality of weights being based on the weight's corresponding parameter's cumulative success at distinguishing authentic documents from non-authentic documents;
and generating an authenticity determination by computing a weighted combination of the plurality of comparison results using the plurality of weights.

Further in accordance with at least one embodiment of the present invention, the analyzing and selecting comprises analyzing the incoming documents including binarizing the documents using a set of binarization thresholds and computing a weighted combination of parameters characterizing the document, the weighted combination defining a set of weights; and at least one of the sets is at least partly determined dynamically as a function of the system's changing state of knowledge including knowledge regarding changes in tolerances of processes used to produce the documents.

Still further in accordance with at least one embodiment of the present invention, incoming electronic documents have VIZ and MRZ zones and the system also comprises apparatus for comparing data in the VIZ with data in the MRZ and for evaluating consistency accordingly.

Additionally in accordance with at least one embodiment of the present invention, incoming electronic documents have VIZ and MRZ zones; the system also comprises apparatus for supplying images of an incoming document in a plurality of scanned illuminations as well as a photo image from visible illumination, and each image is supplied immediately after a certain illumination has been scanned and even before all illuminations are completed.

Also provided, in accordance with at least one embodiment of the present invention, is a computer program product, comprising a computer usable medium having a computer readable program code embodied therein, the computer readable program code adapted to be executed to implement any of the methods shown and described herein.

Typically, each template used herein includes metadata defining commonalities of a type of document, typically of a series thereof, such as physical, visual or contents characteristics of a series of Peruvian driving licenses, superseded a few years later by a newer series of the same Peruvian driving licenses. Metadata may include location data such as the number of mm from the edge of the document to a particular zone, font, colors, watermark patterns, ink parameters, etc.

A particular advantage of certain embodiments of the present invention, such as embodiments involving dynamic evolution of weights, is that knowledge regarding very indicative information may be integrated into the system. For example, if there is a discrepancy in the production of certain indicia in a document (i.e. some indicia are penned rather than being written in security ink) and if the very same indicia are found to contain VIZ vs. MRZ differences, as described herein, this combination of findings may be regarded as highly indicative of a forgery and the weights used may reflect this.

A particular advantage of certain embodiments of the present invention, such as embodiments involving dynamic evolution of thresholds, is that in E-passport identification, information for active authentication may be accessed from the E-passport's chip and may be compared to visual information. For instance, the correspondence between a photograph in the chip and the visible photograph may be checked, to ascertain that the visual photograph has not been tampered with. More or less weight, or higher or lower thresholds, can be dynamically determined, based on past results. For instance, it may be desired to highly weight UV pattern information, since this is difficult to forge. Thresholds for parameters which are found to be statistically prone to cause false alarms, are raised, and so forth.

The term "dynamic" as used herein is intended to include provision of an external configuration file which may be used to assign values to weights, thresholds and other dynamic elements of certain embodiments shown and described herein.

Also provided is a computer program product, comprising a computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "calculating", "determining", "generating", "generating", "producing", "detecting", "associating", "obtaining", "analyzing", "extracting", "receiving", "authenticating", "binarizing", "capturing", and "enhancing" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product. Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIGS. 25, 28 and 32 illustrate aspects of methods for electronic identification of falsified documents which are useful in implementing the method of FIG. 1 and/or the systems of FIGS. 2-24, according to certain embodiments of the present invention.

DETAILED DESCRIPTION OF CERTAIN EMBODIMENTS

Figure 1:
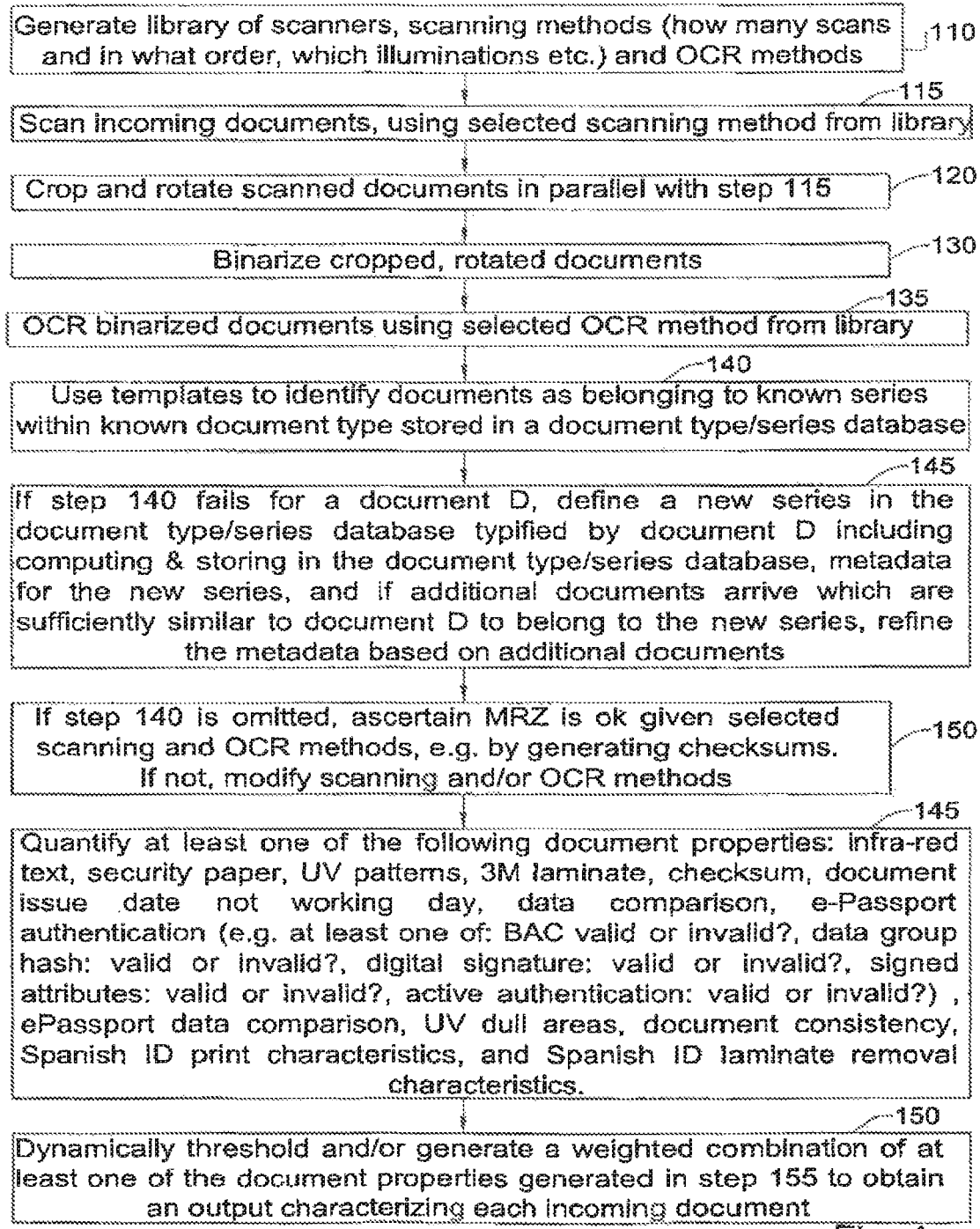
FIG. 1 is a simplified flowchart illustration of a method for Authentication of Electronic Documents, constructed and operative in accordance with certain embodiments of the present invention.

FIG. 1 is a simplified flowchart illustration of a method for scanning, recognizing and processing electronic documents such as travel documents. The method typically includes some or all of the following steps, suitably ordered e.g. as shown:

Step 110: generate library of scanners, scanning methods (how many scans and in what order, which illuminations etc.) and OCR methods Step 115: scan incoming documents, using selected scanning method from library.

Step 120: crop and rotate scanned documents in parallel with step 115

Step 130: binarize cropped, rotated documents

Step 135: OCR binarized documents using selected OCR method from library

Step 140: use templates to identify documents as belonging to known series within known document type stored in a document type/series database. Typically, each "template"

includes data characterizing a series within a type of document generated by a country, under each of at least one illumination such as UV or IR. For example, the "template" for series 4 of a French driving license under UV illumination might include a stored indication, in an appropriate database, of some or all of the size, paper type, ink type, coating, printing technology, location of various elements (such as but not limited to photograph, serial number, MRZ area, and issue date), UV illumination-related characteristics, and other characteristics of the fourth series of French driving licenses. Any suitable method may be employed for building templates given initial example documents of a series.

Step 145: if step 140 fails for a document D, define a new series in the document type/series database typified by document D including computing and storing in the document type/series database, metadata for the new series, and if additional documents arrive which are sufficiently similar to document D to belong to the new series, refine the metadata based on additional documents.

Step 150: if step 140 is omitted, ascertain MRZ is ok given selected scanning and OCR methods, e.g. by generating checksums. If not, modify scanning and/or OCR methods.

Step 155: quantify at least one of the following document properties: infra-red text, security paper, UV patterns, 3M laminate, checksum, document issue date not working day, data comparison, e-Passport authentication (e.g. at least one of: BAC valid or invalid?, data group hash: valid or invalid?, digital signature: valid or invalid?, signed attributes: valid or invalid?, active authentication: valid or invalid?), ePassport data comparison, UV dull areas, document consistency, Spanish ID print characteristics, and Spanish ID laminate removal characteristics.

Step 160: dynamically threshold and/or generate a weighted combination of at least one of the document properties generated in step 155 to obtain an output characterizing each incoming document. In step 160, non-binary data regarding at least one of the typically non-binary document properties listed above with reference to step 155, is first binarized, using thresholds, to obtain binarized document properties, and is then combined in a weighted combination. Typically, both the thresholds and the weights are not fixed but rather are dynamically determined e.g. by means of one or more external configuration files.

A Software Document Reader (SDR) constructed and operative in accordance with certain embodiments of the present invention is now described. Typically although not necessarily, the Reader is implemented as a software package designed to scan and recognize travel documentation. The SDR works with many different document scanners since its added value is in the recognition, decoding and fraud detection of the documents. It is built using an open architecture with a simple uniform interface. The SDR is typically enhanced, periodically or occasionally, with new document templates and fraud detection techniques.

Typically, the recognition and decoding engine of the SDR uses methods shown and described herein. In order to reach the best possible recognition accuracy, a very large number of documents (such as over a million) may be scanned and analyzed. The recognition and decoding engine may be trained to recognize hundreds of types of non-standard documents (from over 150 countries), including documents without any MRZ area. The recognition accuracy of standard ICAO 9303 travel documents is close to 100% and over 95% with non-standard documents. The SDR also contains a special image optimizer which fixes bad quality images (such as: from washed-out or worn documents), images scanned at an angle.

Typically, the Fraud Detection module of the SDR is in charge of recognizing document frauds. Both document data checks (such as checksum errors and consistencies between the visible and MRZ areas of the document) and image analysis checks are done. The images of a document are analyzed using methods shown and described herein to determine their authenticity based on, inter alia, one or more of checking for B900 ink, security paper, UV patterns, cuts in the retroflective laminate and others.

There is an optional Image Library component that contains a comprehensive document library. For each document, there are both images (in several illuminations) and information for all document pages. This component complements the fraud detection module and allows for additional manual authentication.

A suitable high-level functionality of the SDR software component, and a suitable breakdown of the inner modules of the SDR, some or all portions of which may be implemented, are now described with reference to FIG. 2. The SDR supports various scanners as described herein and includes an optional Image Library component. Recognition accuracy and fraud detection capabilities of the SDR are also described herein.

Typically, the SDR comprises an ActiveX component (OCX) 205 which typically interfaces with multiple external scanners using the supplied manufacturer's scanner drivers. They may be separately installed on the client machine where the SDR operates. The SDR may be used in any development environment that supports ActiveX components (such as Microsoft Visual C++, Microsoft Visual Basic, Borland Delphi, etc.). The SDR provides a uniform interface for working with all document scanners. Not all the SDR features are available for every document scanner, depending on the scanner features. For example, some document scanners only support IR and visible illuminations and therefore are not able to scan UV and 3M illuminations. The SDR software architecture is typically open and modular so as to allow for very quick modifications and enhancements such as new document templates and additional fraud detection techniques.

Typically, the SDR is written as an ActiveX for enhanced usability and ease of use. If the SDR is written as an asynchronous component, all methods result in success or failure events. The SDR supplies images of the document in all scanned illuminations and the photo image from the visible illumination. The images can be received immediately after a certain illumination has been scanned, even before all illuminations are completed. The recognition results can also be received before the document has been completely scanned. When the document recognition has completed, a special event is fired and the host application may access all the document information. The images can be received in multiple possible formats: JPEG, TIFF, Bitmap, and PNG. Images can be received in their original resolution or resized to any requested resolution. JPEG images can be compressed to sizes of as little as 25 Kb per image. Every document field also has a correlating accuracy field. This field specifies any errors or problems found with the specific field. Examples of such errors include validity errors, rejected characters, checksum errors and expired dates.

Figure 2:
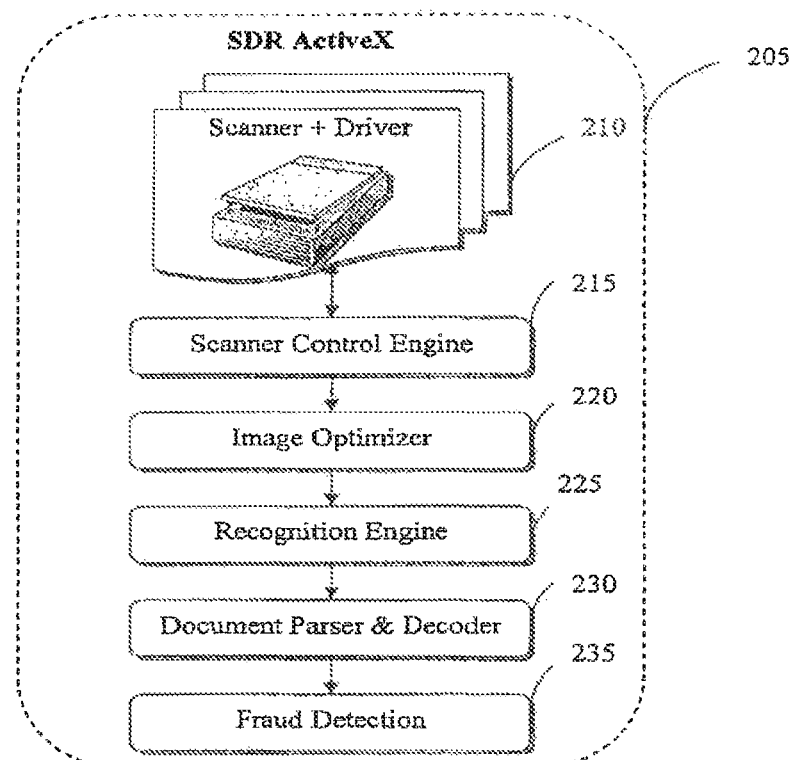
FIGS. 2-24 and 26 illustrate aspects of a system for Authentication of Electronic Documents, constructed and operative in accordance with certain embodiments of the present invention.

The scanners 210 in FIG. 2 may include some or all of the following scanners: Oce' IDS-CSR 4054, RTE 6701, AiT Pax Reader, Regula Document Reader and others, which vary in their type (full page/swipe/b&w/color etc.) supported illuminations, resolutions, speeds and interfaces.

Typically, a Scanner Control Engine module 215 controls the different scanner operations. Each scanner 210 that is added to the SDR is optimized to work in the best possible way. Even though module 215 works with many different scanners, it publishes a uniform interface to allow for maximum modularity and future compatibility. The Scanner Control Engine 215 updates its operation while scanning a document in accordance with the document decoder. For example, if a British passport is being scanned, the UV image may be scanned using an optimized setting (lower UV gain) and the retroflective image may not be scanned at all, since this passport does not have this security feature. The module 215 is able to scan any configuration of illuminations e.g. IR, visible, UV and retroflective. For example, only the IR and UV illuminations or only the visible illumination, may be scanned. The Scanner Control Engine 215 also ensures that all scan operations are done asynchronously in order to allow the other modules to work in parallel to these operations.

An Image Optimizer module 220 analyzes images received from a scanner and optimizes them for a recognition engine, described in detail below. This operation is especially important for worn or washed out documents. It allows the recognition engine to read these problematic documents with much better results. In addition, the Image Optimizer locates the image borders and crops the image accordingly. It also locates the facial image of the document and extracts its coordinates. The Image Optimizer is also able to fix images that are scanned at up to 15 degree angles.

Typically, a Recognition Engine module 225 reads both the visible and Machine Readable Zone (MRZ) of the document, enhances the readability of the documents and achieves the best possible recognition accuracy.

Typically, a Document Parser & Decoder module 230 analyzes the recognized document text and parses the data into the output fields, taking into account multiple recognition results obtained from all scanned illuminations. The document parser uses a large document template database in order to decide what the correct document type is and how to parse the recognized document data. A Fraud Detection module 235 is in charge of detecting document frauds. Such fraud detection may comprise one or both of two types:

a. Document data analysis: Typically, encompasses checks based on recognized document data such as checksum errors, validity errors and consistency checks between the visible and MRZ areas of the document; and b. Image analysis: Typically, encompasses checks that use image processing techniques to detect frauds. Examples of some of these checks are: Security Paper Detection & UV Pattern Authentication (UV illumination), B900 ink (IR illumination), and document cut detection in 3M laminate (retroflective illumination).

The recognition engine 225 is typically specially tailored for recognizing travel documentation. Large populations of travel documents from all over the world may be analyzed in pilot testing in order to achieve this. Since a large number of travel documentation does not conform to the ICAO standards, typically many documents from different nations are analyzed in an ongoing effort, and the SDR of FIG. 2 uses an SDR document database to which new documents are added on an ongoing basis. The recognition accuracy of the SDR for standard documents conforming to the ICAO 9303 standard may be close to 100% whereas non-standard documents, such as the Lichtenstein passport, the Russian visa or the Canadian permanent resident card may have a lower recognition accuracy such as approximately 95%.

Typically, the SDR of FIG. 2 may support many document types, such as but not limited to non-standard ICAO documents, such as Passports (Standard, Diplomatic, Service, Alien, Emergency, Temporary, etc.), Visas, Identification Cards, Permanent Resident Cards, Border Crossing Cards, Reentry Permits, Refugee Travel Documents, Laissez-Passers, Driver Licenses and Immigration Forms. Special learning capabilities may be added to the SDR in order to cope with the vast amount of travel documentation available throughout the world. These capabilities may include the ability to read from both the visible and MRZ areas of the document and the ability to read documents without an MRZ area at all.

Typically, US visas are handled as a special case because the expiration date only appears in the visible area of the document in most of the cases. The visa type is examined and expiry date information is extracted from the correct location. Also, the SDR may recognize all the US visa subtypes such as Student Visas, Work Visas, etc. In order to make sure that the recognition accuracy does not suffer when adding new document templates, a specialized regression tester may be provided which runs a completely automated test, checking hundreds of sample documents that are a good representation of most real-world documents.

Fraud Detection module 235, according to certain embodiments of the present invention, is now described in detail. Travel documentation is the main identification measure used to identify a person, hence it is useful for such documentation to be authenticated. Most biometric identification systems today rely on the reliable initial identification of an individual based on proper travel documentation. If the person is able to forge a document at this stage, all future biometric checks are useless. It is appreciated that if the module correctly identifies some document frauds but gives very high false rejects, the fraud identification process becomes very unreliable and unusable. Therefore, fraud detection techniques are selected in order to minimize the number of false rejects and may take into account many factors, including document information such as document type and issuing country, particularly in cases where authentic documents are issued that do not conform to the ICAO standards, such as not using B900 ink. The methods for detecting document frauds may include:

a. methods which analyze the document data such as checksum errors and consistency checks between the MRZ and visible areas of the document. The checksum errors can detect changes made to the MRZ. There are also validation checks that ensure, for example, that the issue date occurs on a valid working day; and/or b. image analysis checks based on image processing for images of all illuminations, which detect if the document uses B900 ink or is printed on security paper. It can also find cuts (tampering) in the retroflective laminate or if the correct pattern in the UV illumination is found.

An Image Library Component is optionally provided which includes a comprehensive database of travel documents from countries around the world. The component is also supplied as an ActiveX component with its accompanying database. For every document, the image library can show images and information about the cover page, data page, flyleaf pages and others. The images are available in different illuminations such as visible, IR, UV, retroflective and others. The security features for every page are highlighted (with red squares) and can be clicked on to show a magnified image of the area and specific information about the security feature. This library of images and information is useful for comparing with actual document scans and manually determining if the document appears to be authentic. This feature complements the automatic fraud detection engine 235 integrated into the SDR of FIG. 2. The image library may be updated periodically e.g. quarterly with new documents and security features.

Figure 3:
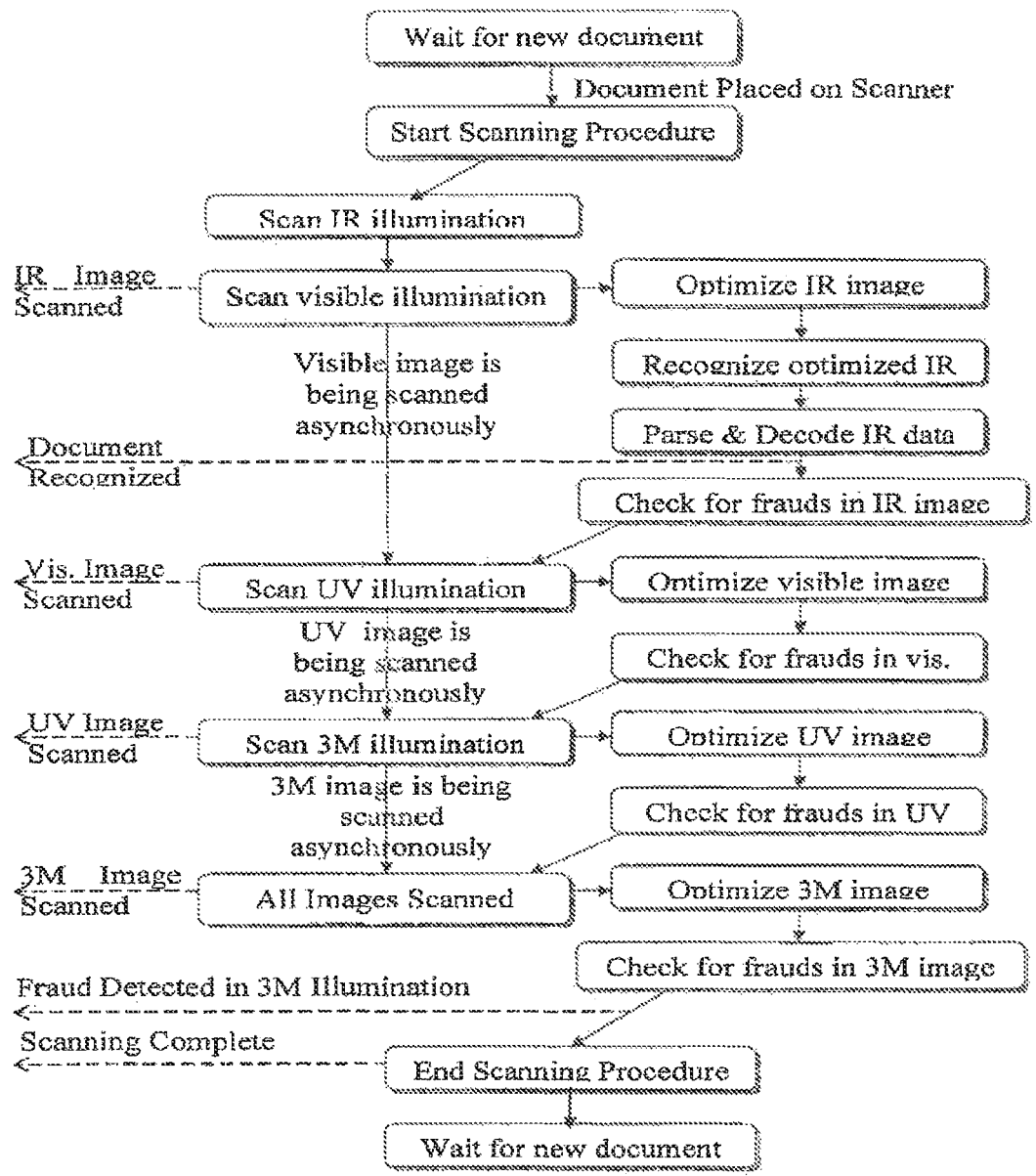
Figure 4:
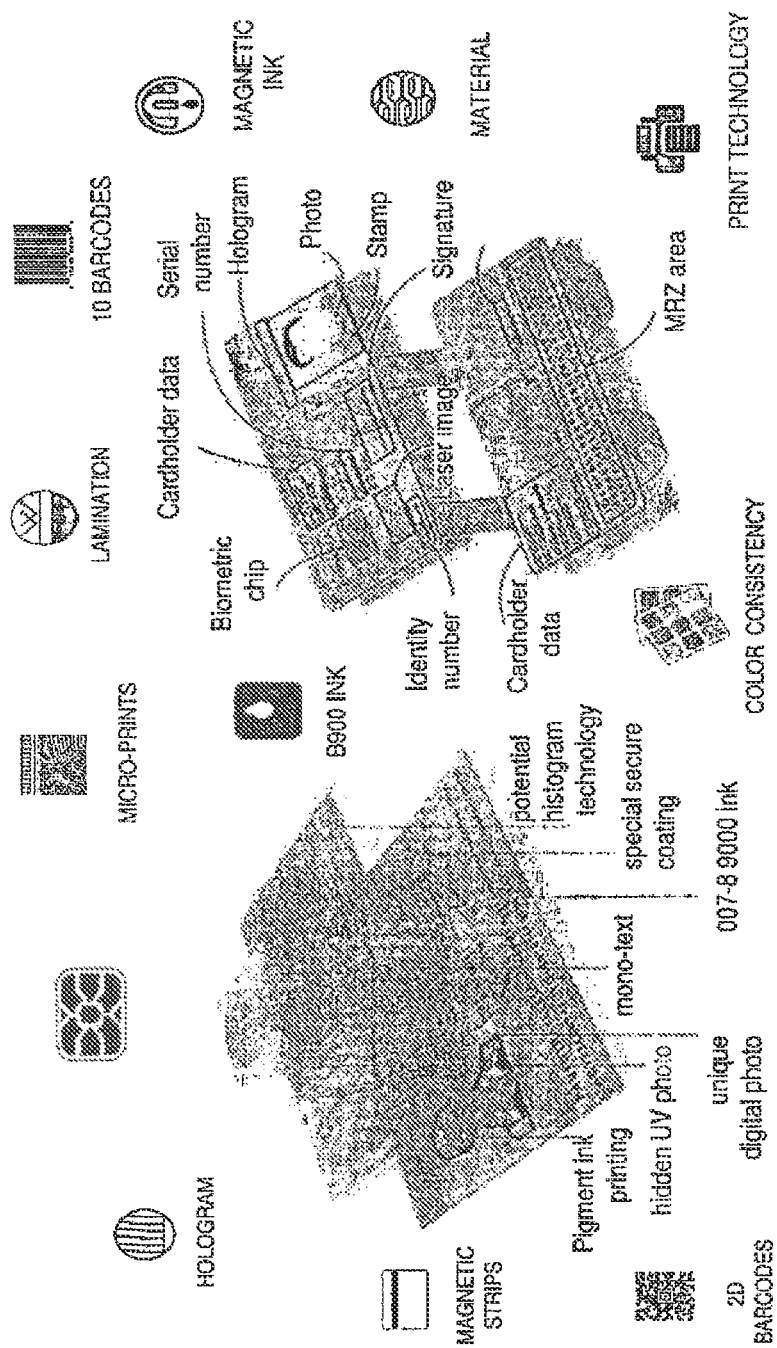

FIG. 3 is a flowchart of a sample document scanning scenario which may be performed by the system of FIG. 2. Some or all of the steps illustrated may be provided, suitably ordered e.g. as shown. This example is based on a scanning scenario where all illuminations are scanned, the document is recognized from the IR illumination and a fraud is detected in the 3M laminate. It is appreciated that in many applications, thousands of potential clients need to be identified, qualified and recorded daily. Identity documents may contain 100 or more identity data and security features, used for generating authentication decisions, in many of which identity data and security features are neither visible nor legible by the human eye, e.g. as shown in FIG. 4. Parameters used may include visual parameters, hidden information and/or information which resides on servers.

Figure 5:
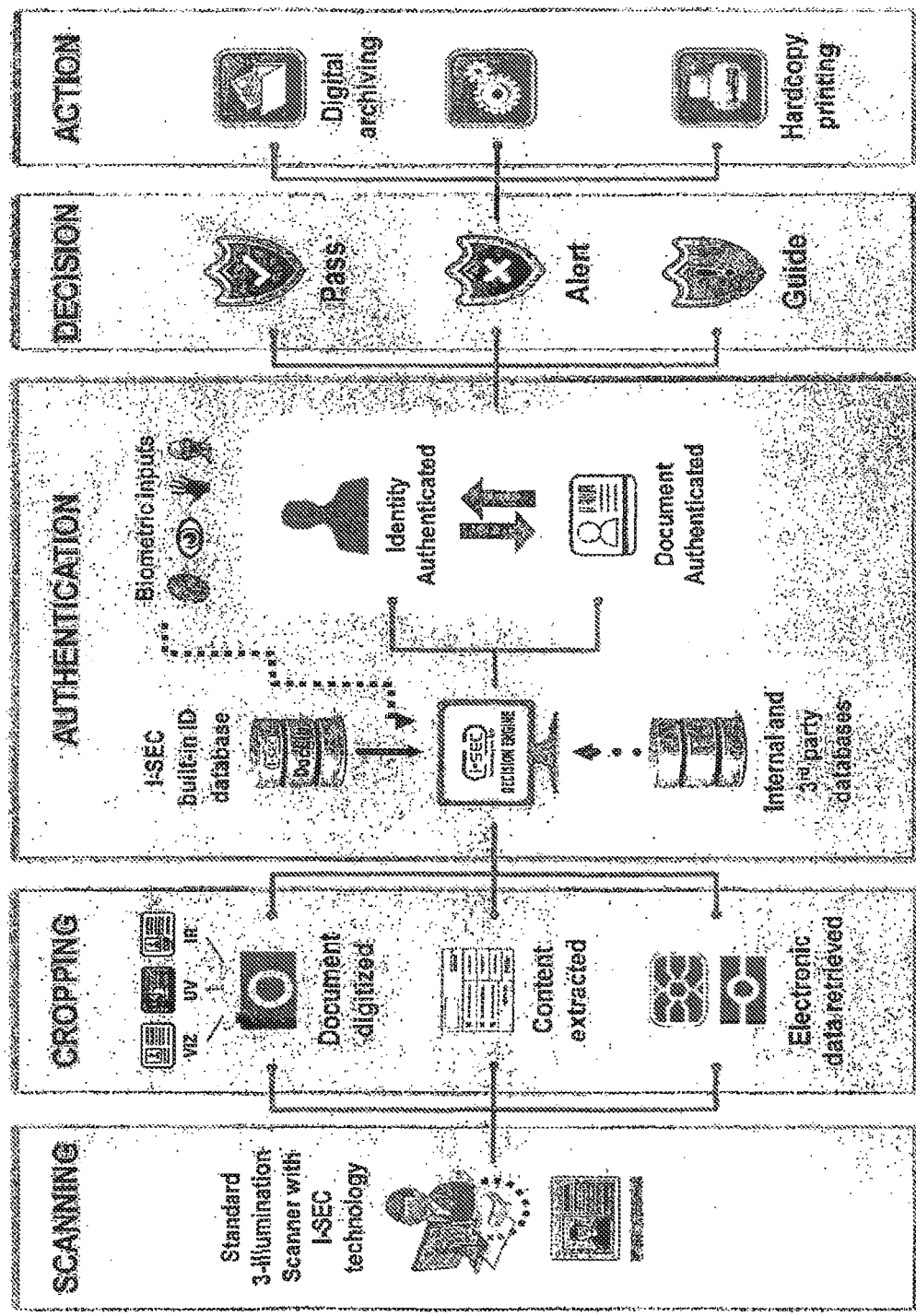
Figure 6:
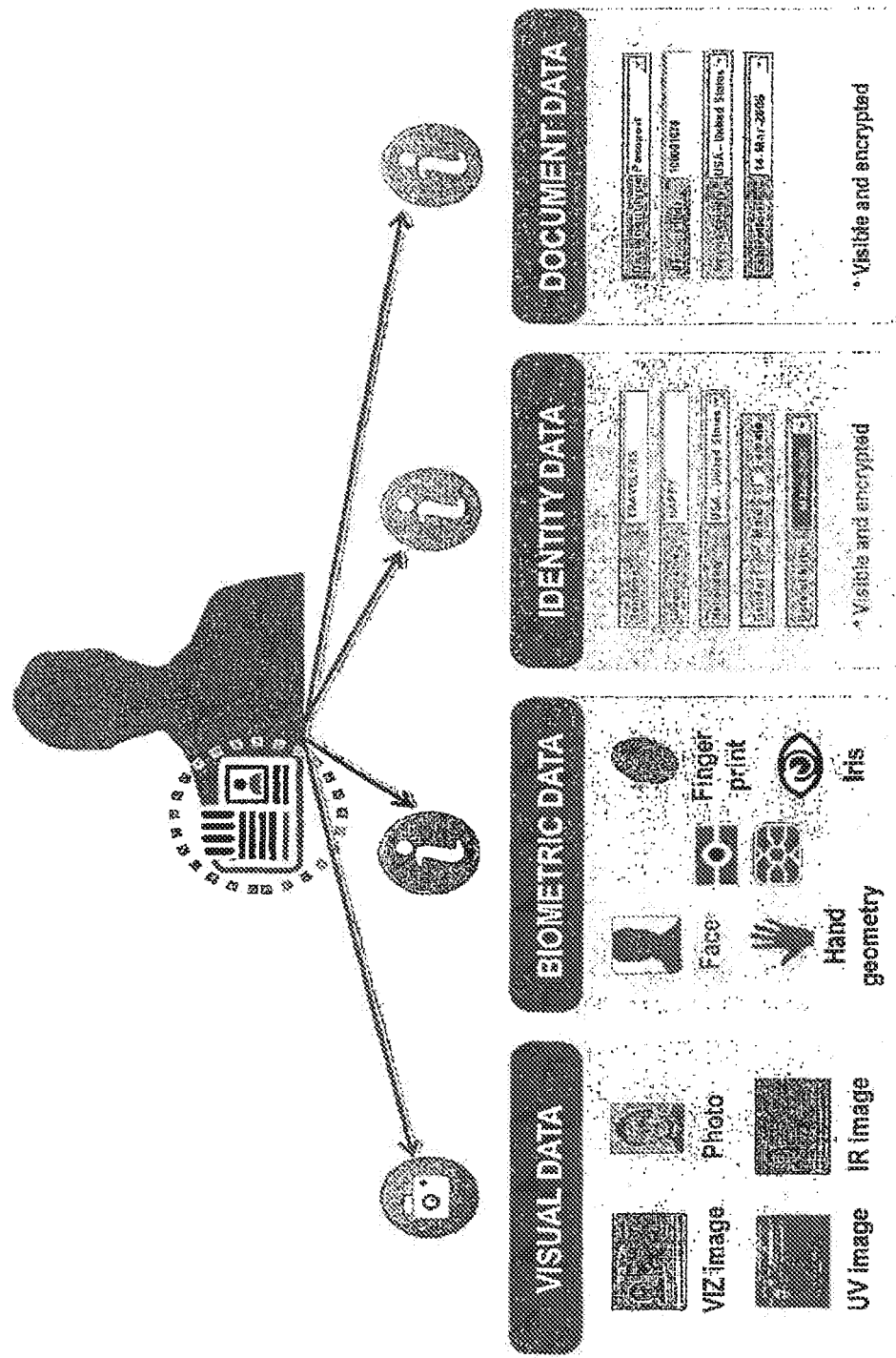
Figure 7:
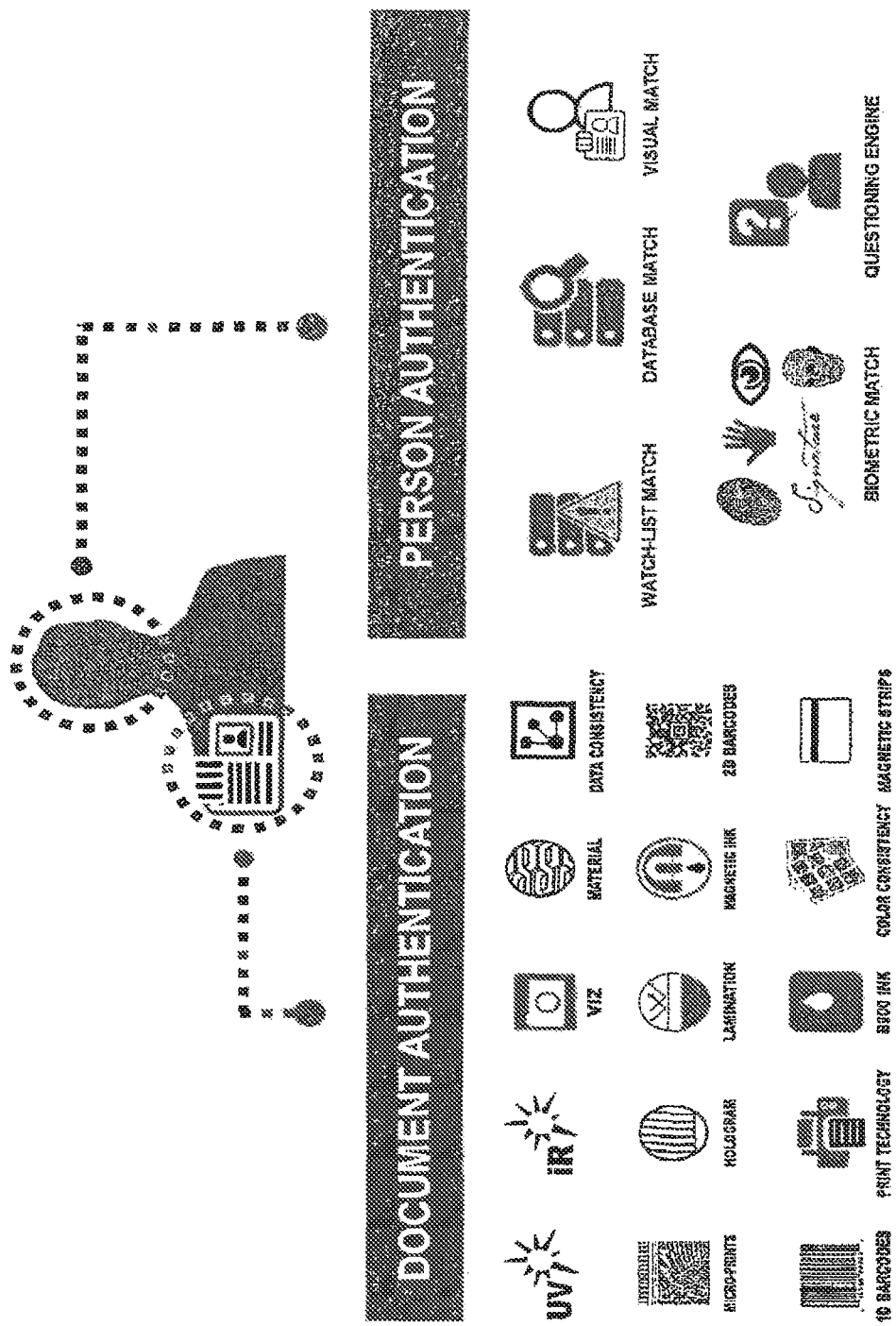
Figure 8:
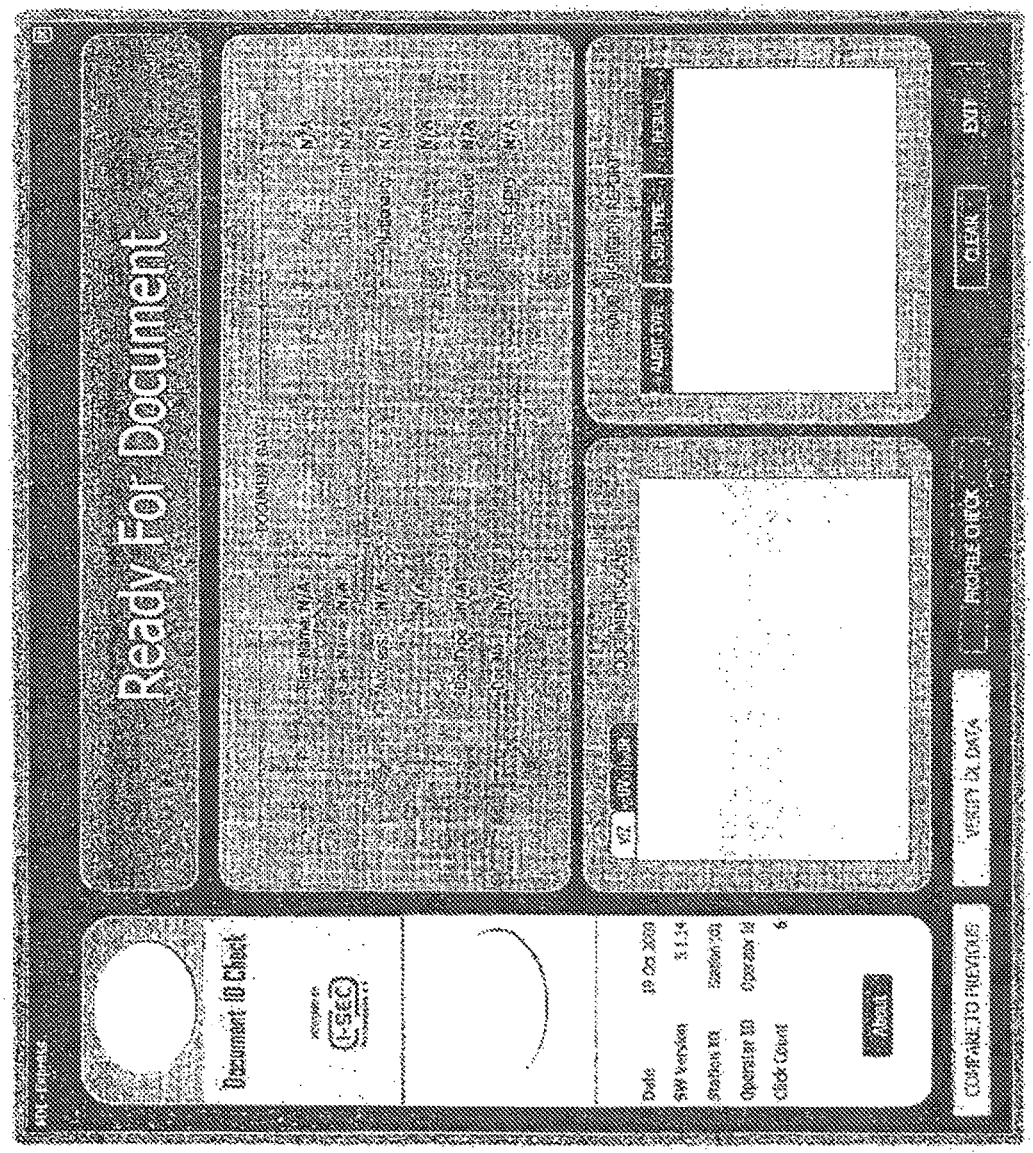
Figure 9:
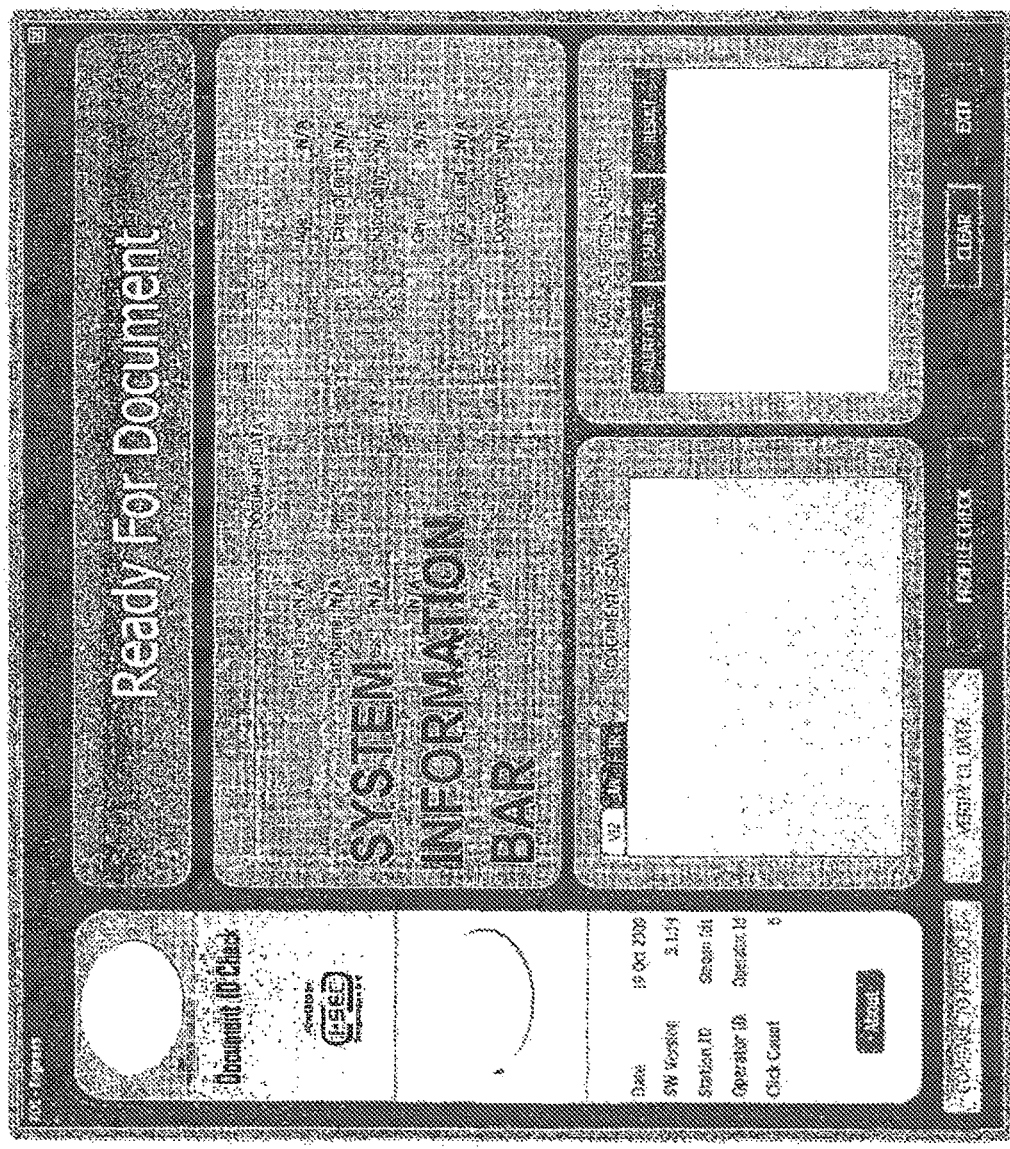
Figure 10:
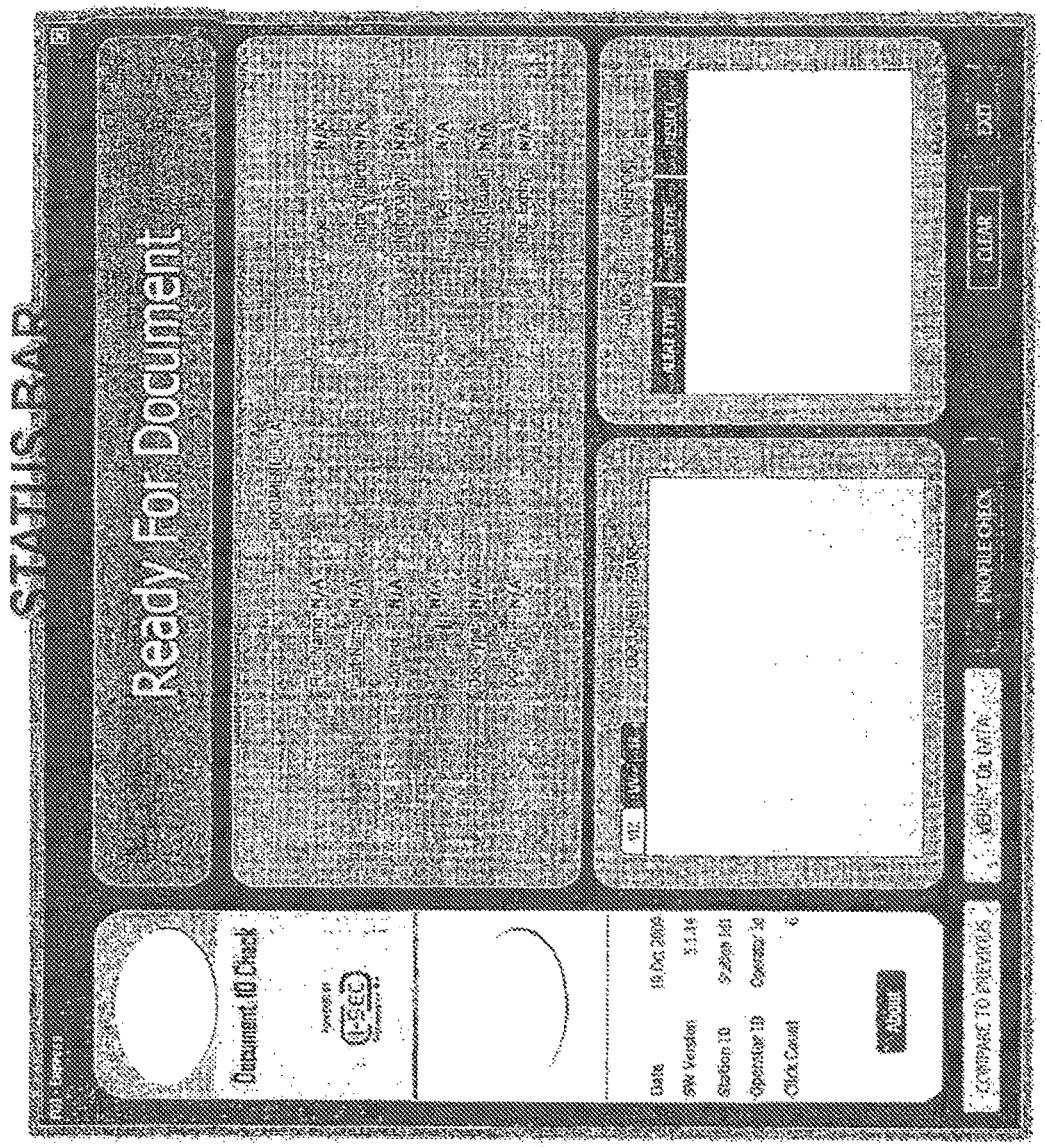
Figure 11:
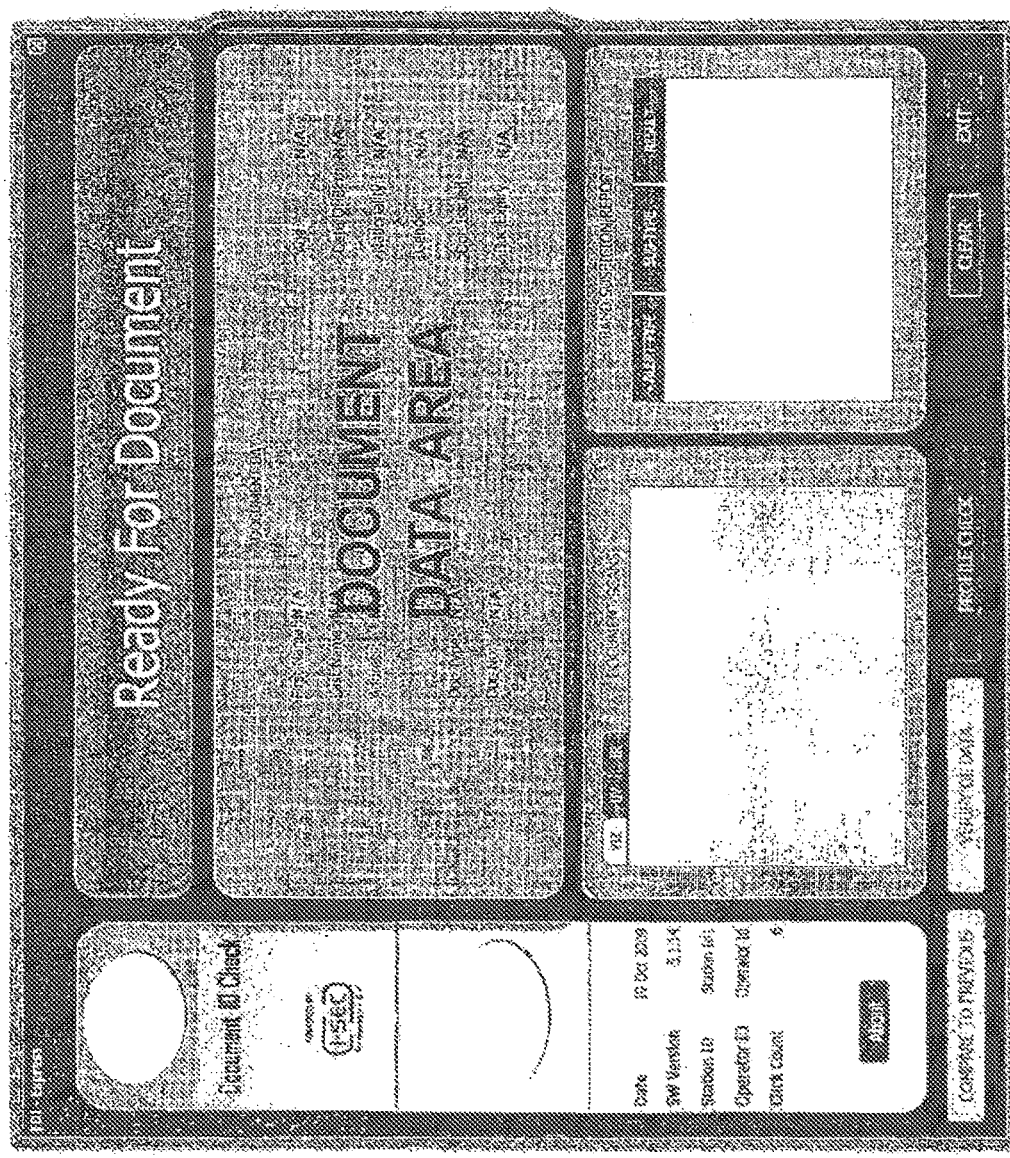
Figure 12:
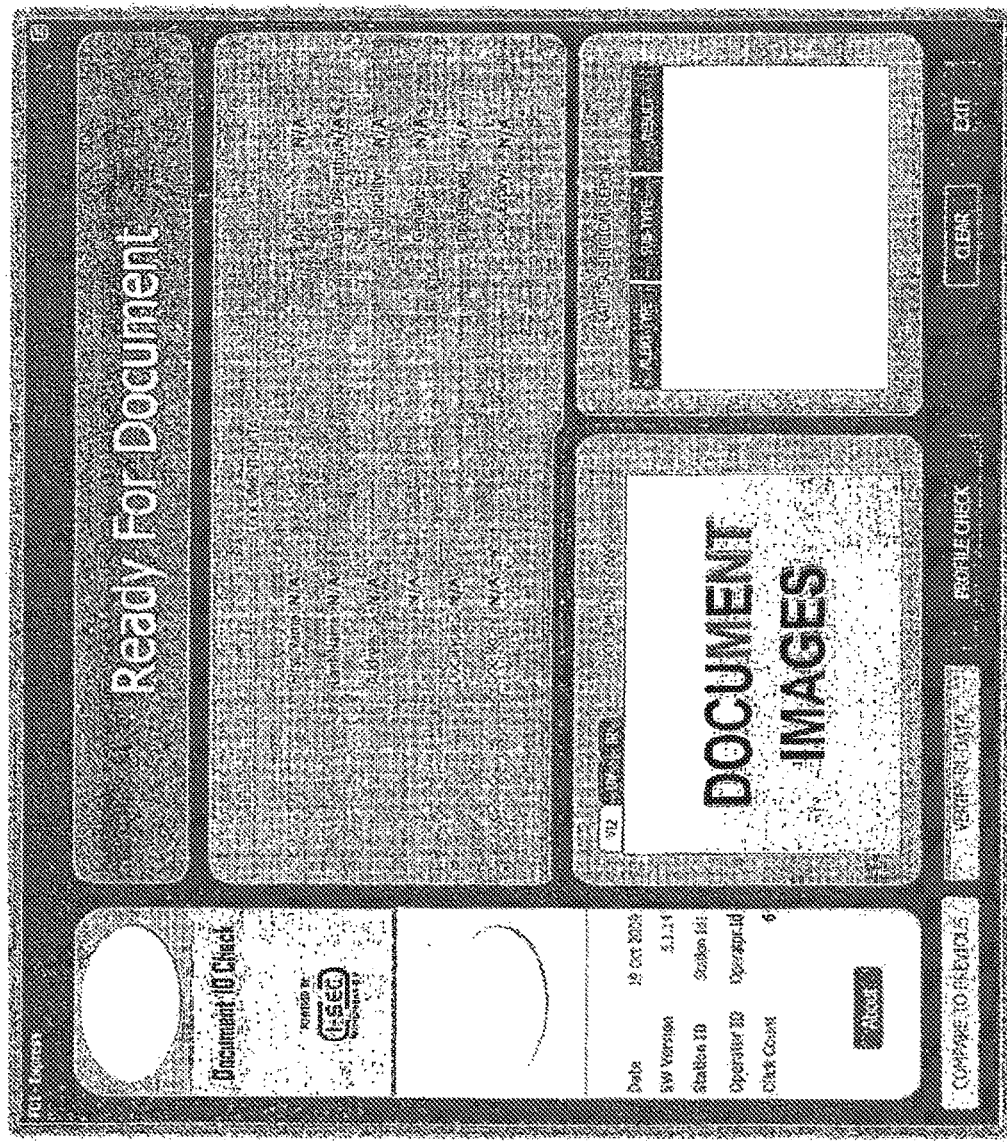
Figure 13:
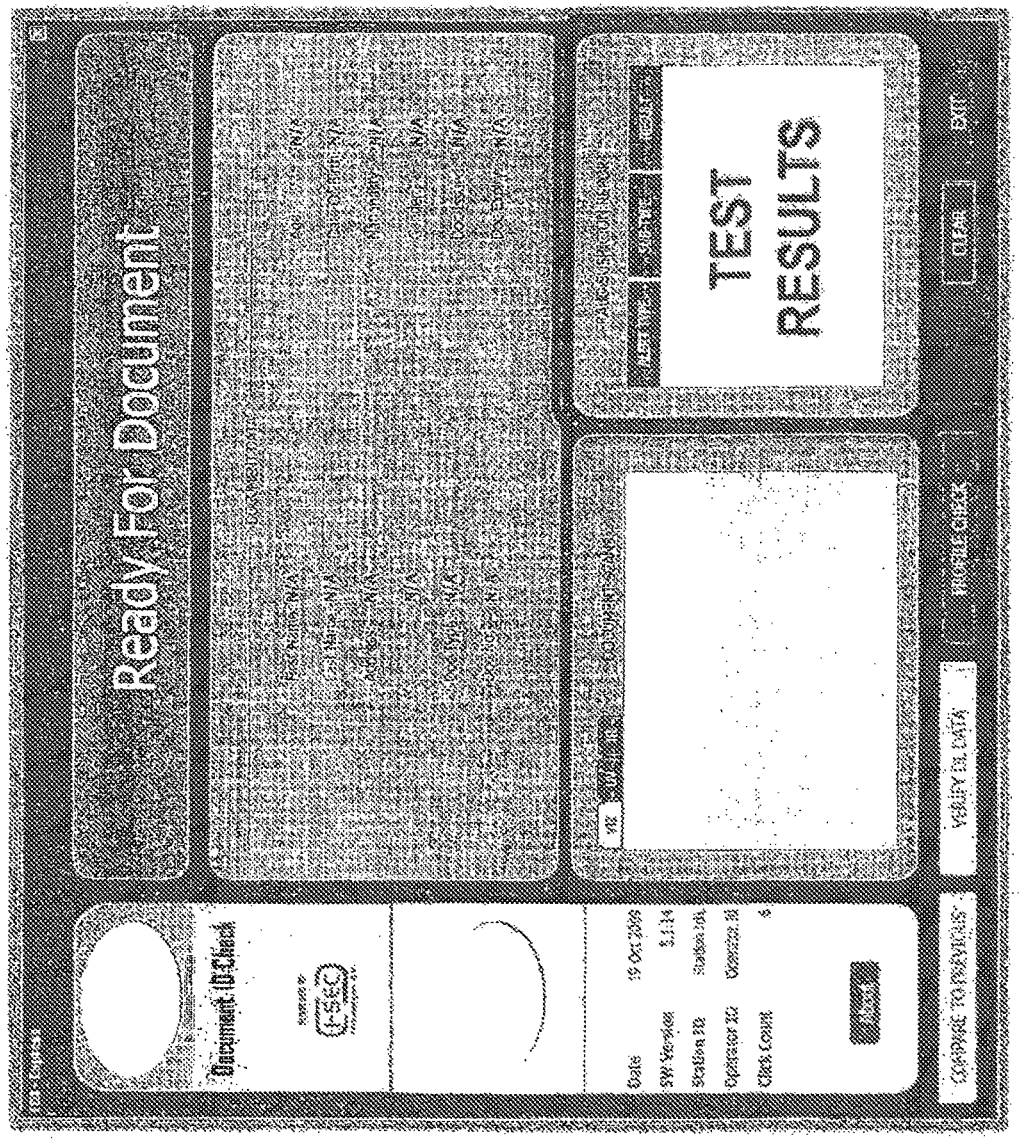
Figure 14:
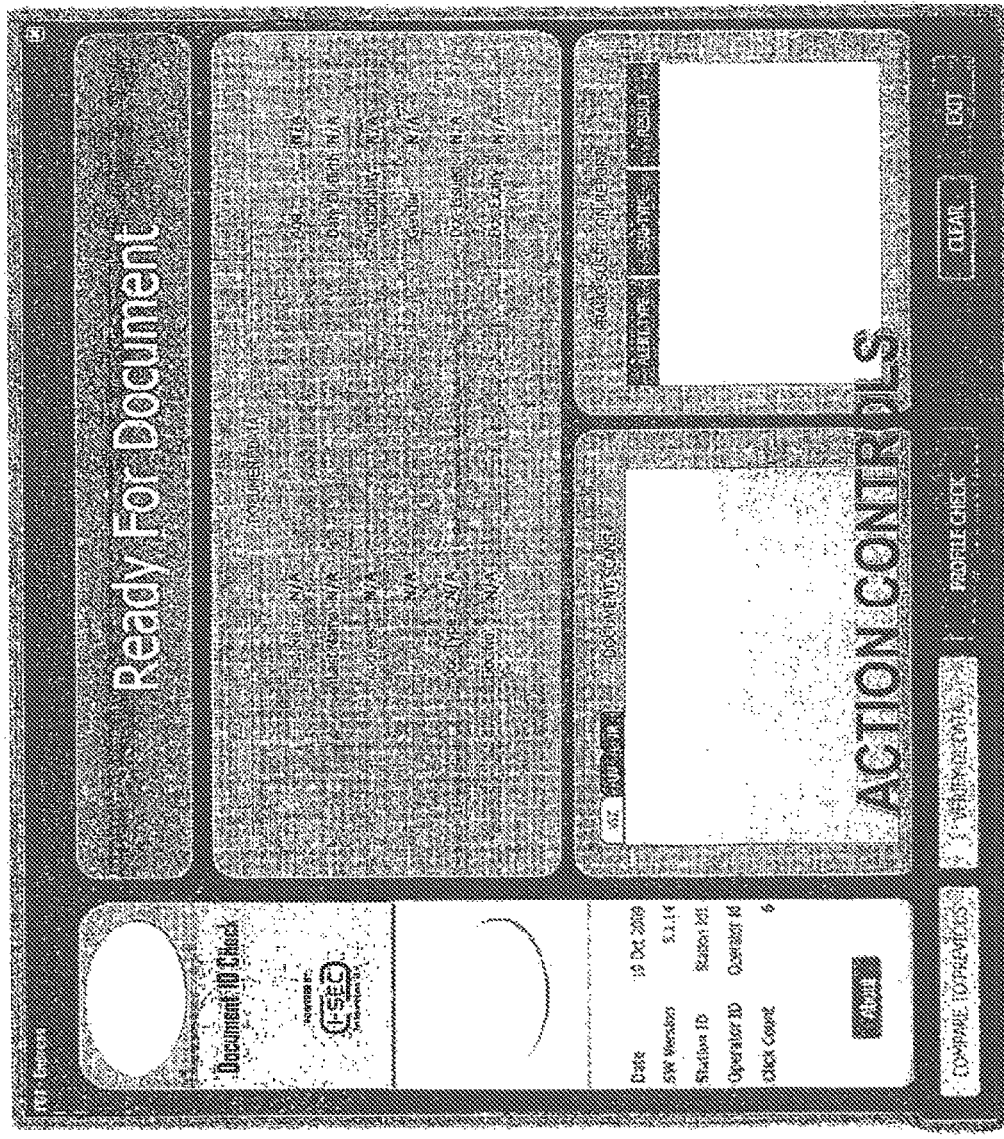

Customer data entry is often incomplete and involves typographical errors, slowly degrading photocopies having to be manually archived, identity fraud occurs and potential clients being rejected unnecessarily. The Front-End Identity Document Based Authentication systems shown and described herein reduce or obviate these problems. FIG. 5 is an example of functionalities which may be performed by a Front-End Identity Document Based Authentication system in accordance with certain embodiments of the present invention. FIG. 6 illustrates high-accuracy Multi-layer document cropping. FIG. 7 illustrates high-accuracy Multi-layer document authentication. FIG. 8 is a Document ID Check opening screen. FIGS. 9-14 illustrate DID Check screen areas such as system information bar, status bar, document data area, document images, test results and action controls, respectively.

Figure 15:
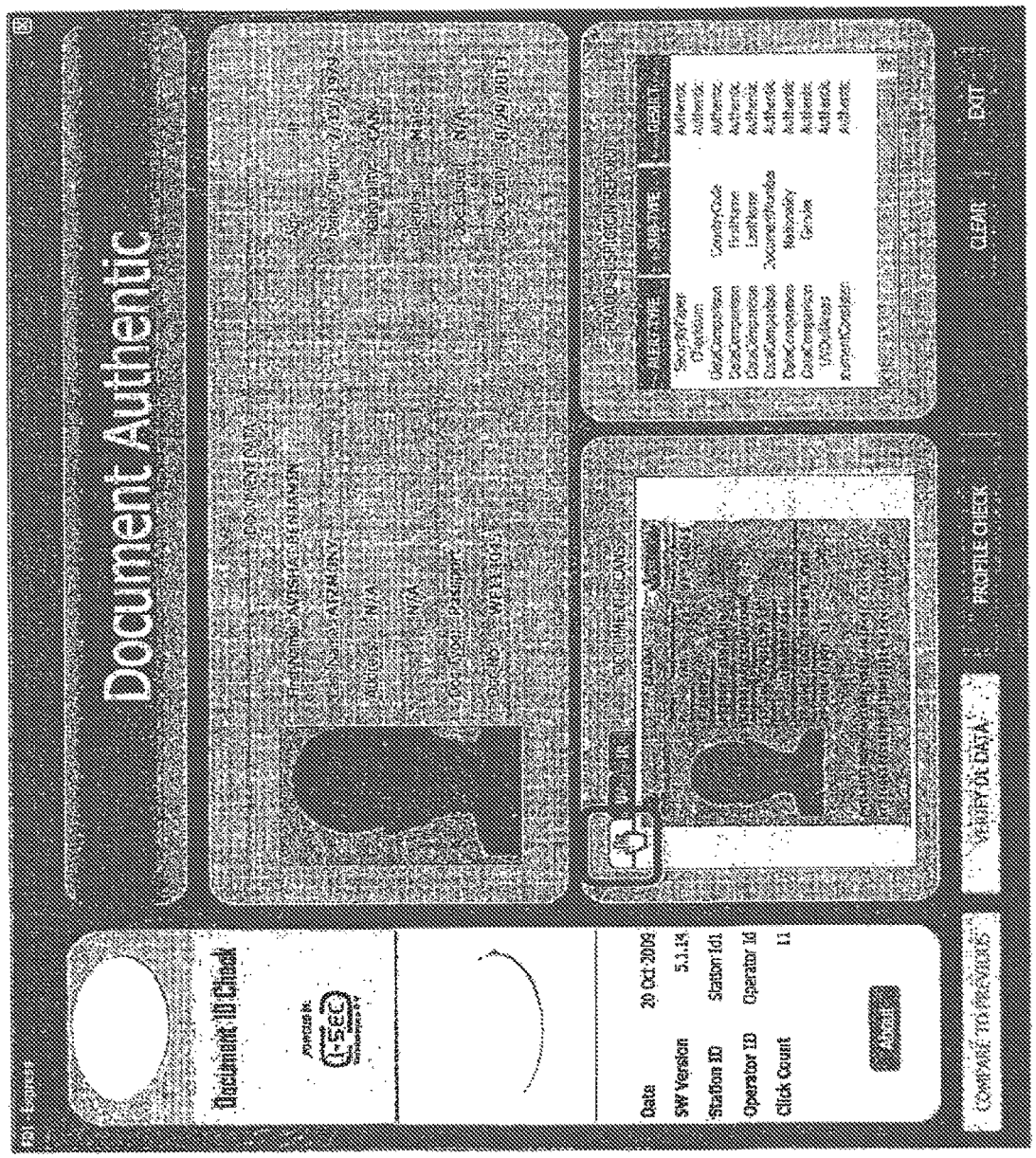
Figure 16:
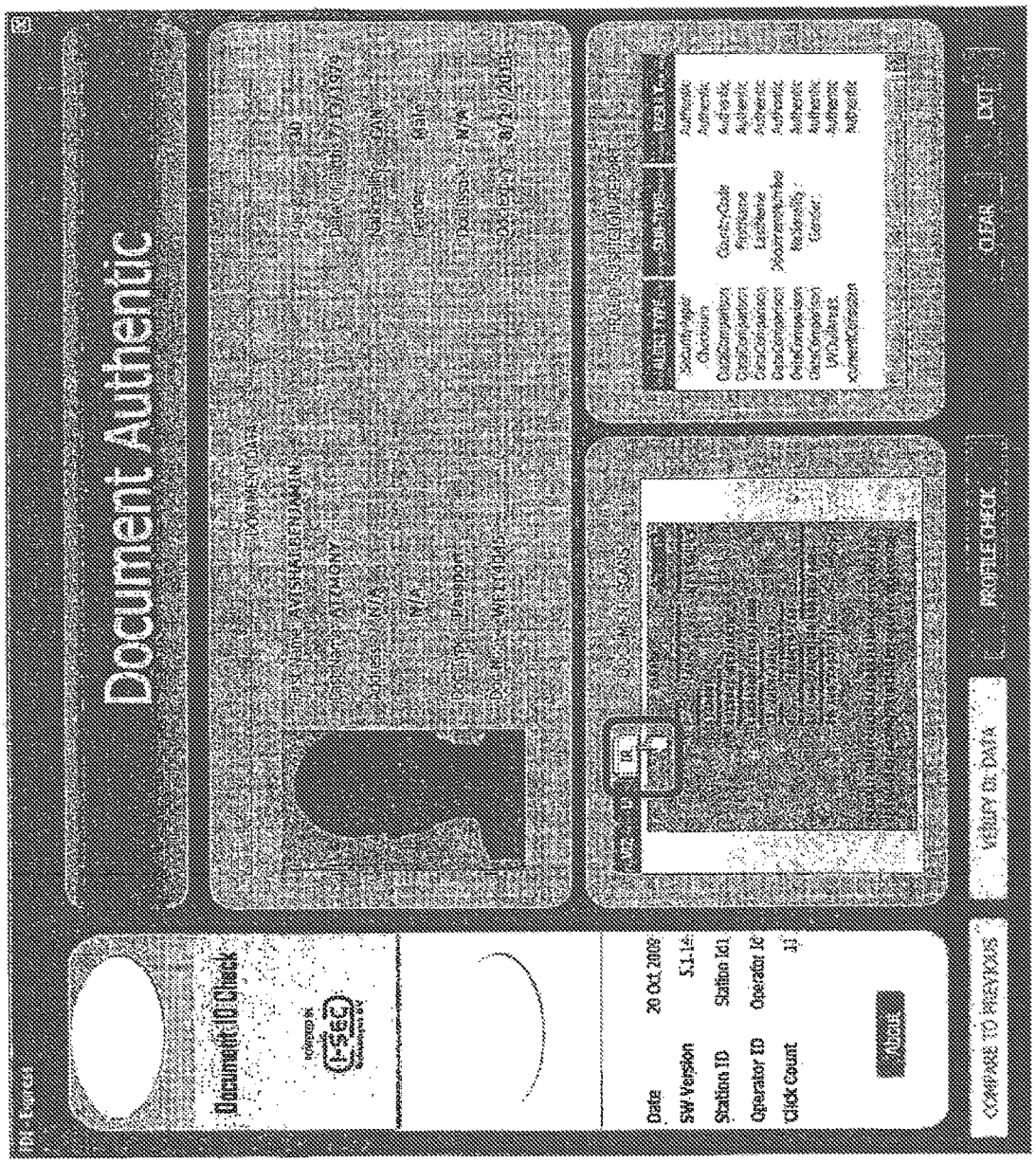
Figure 17:
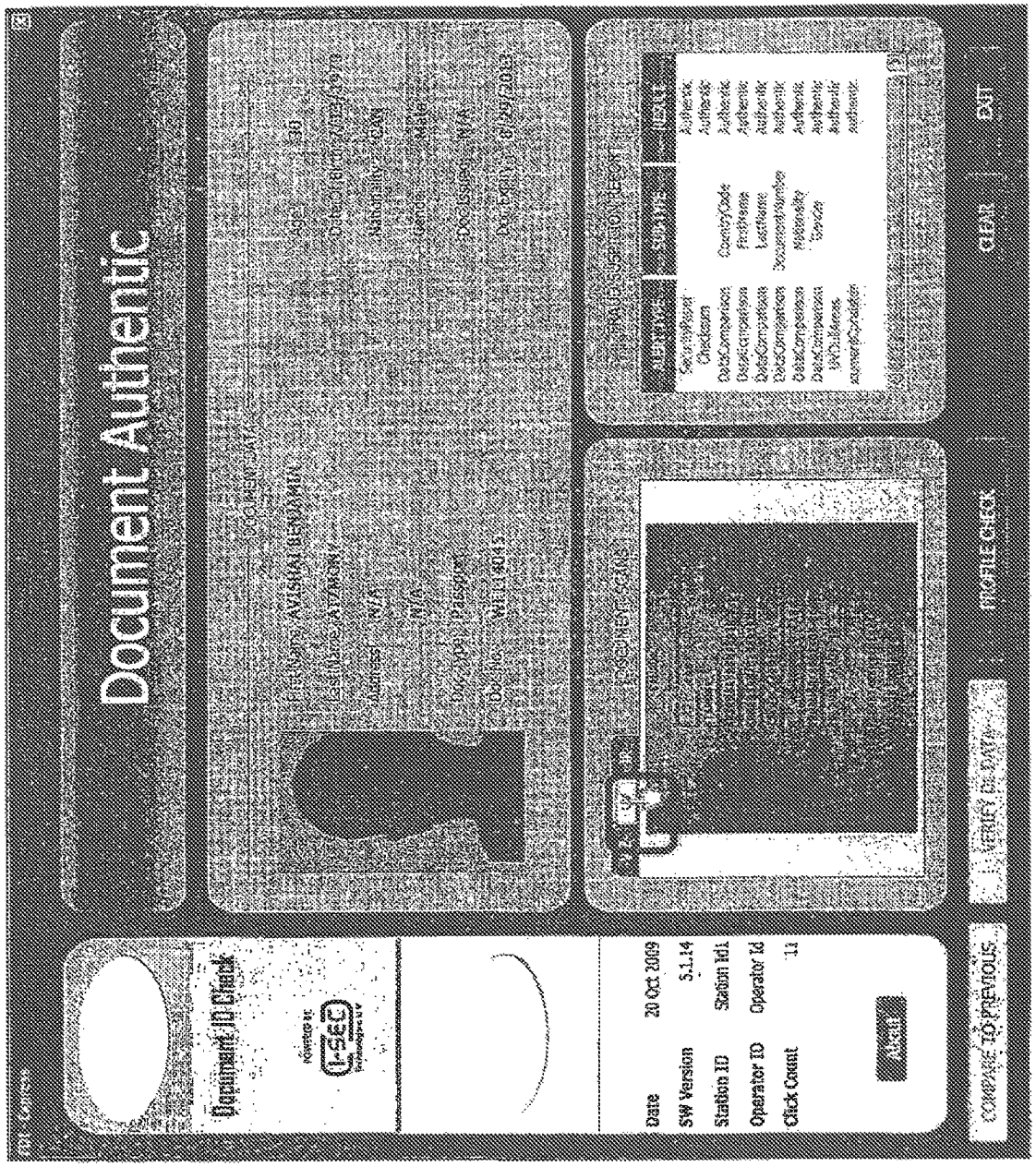
Figure 18:
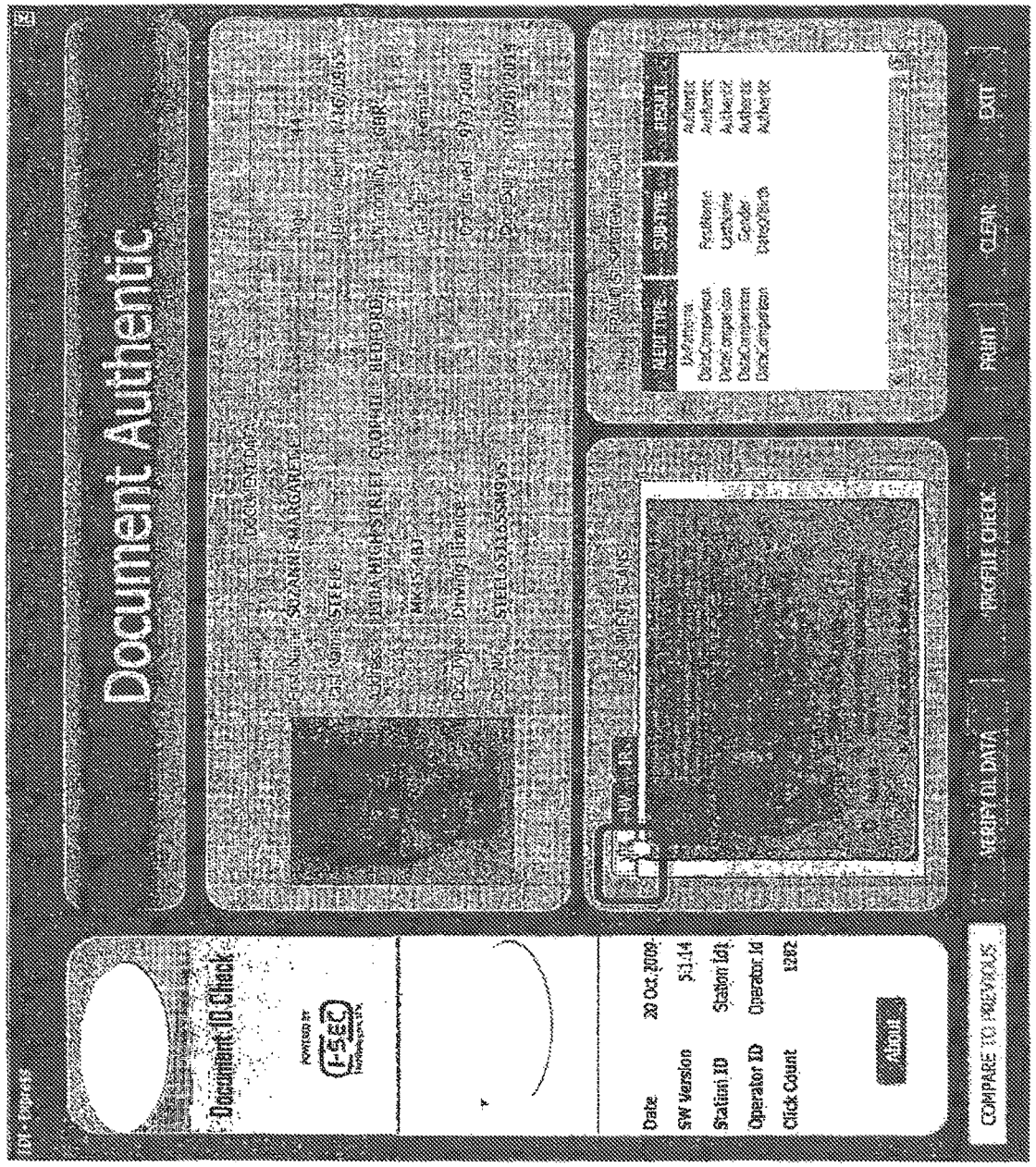
Figure 19:
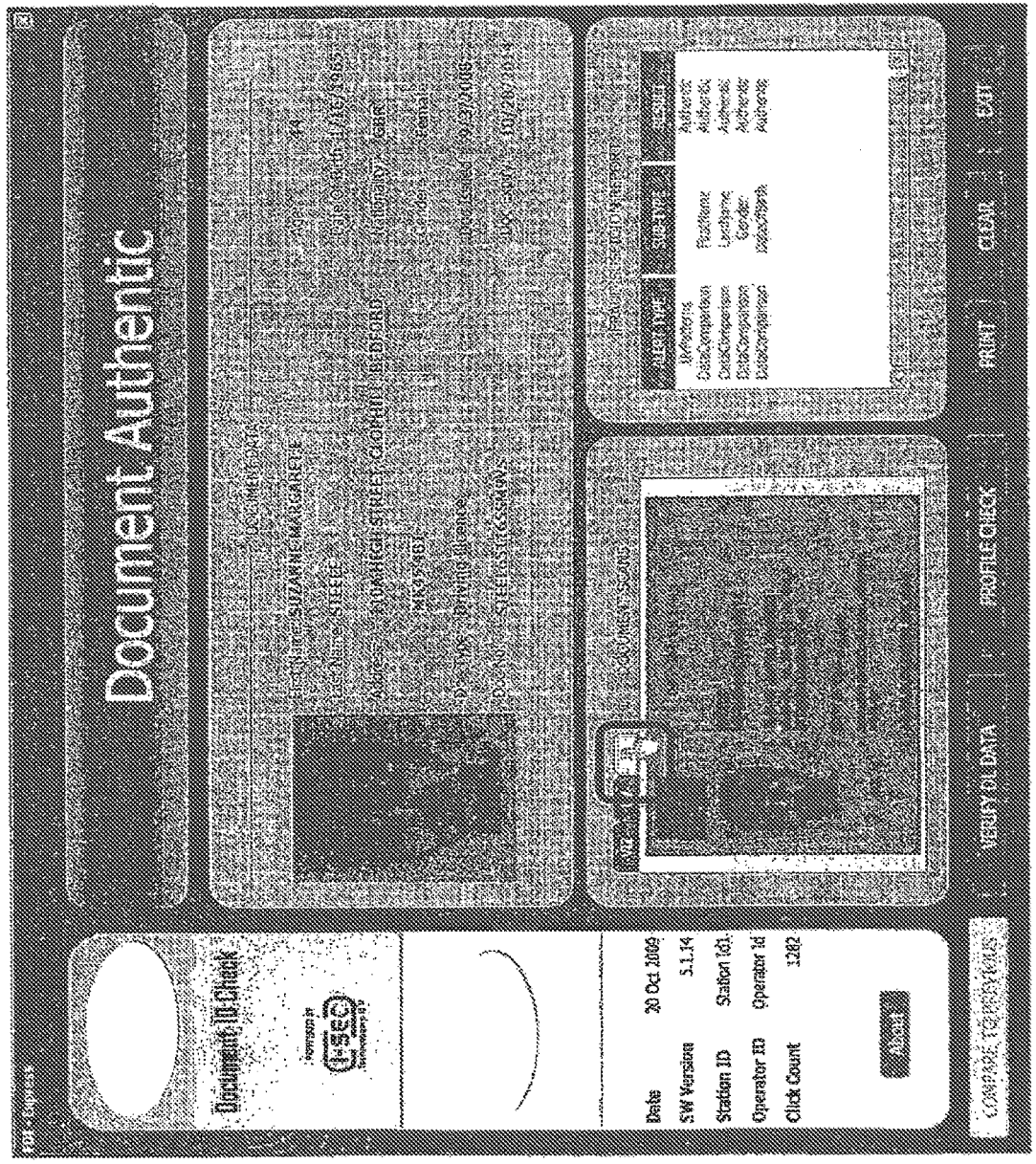
Figure 20:
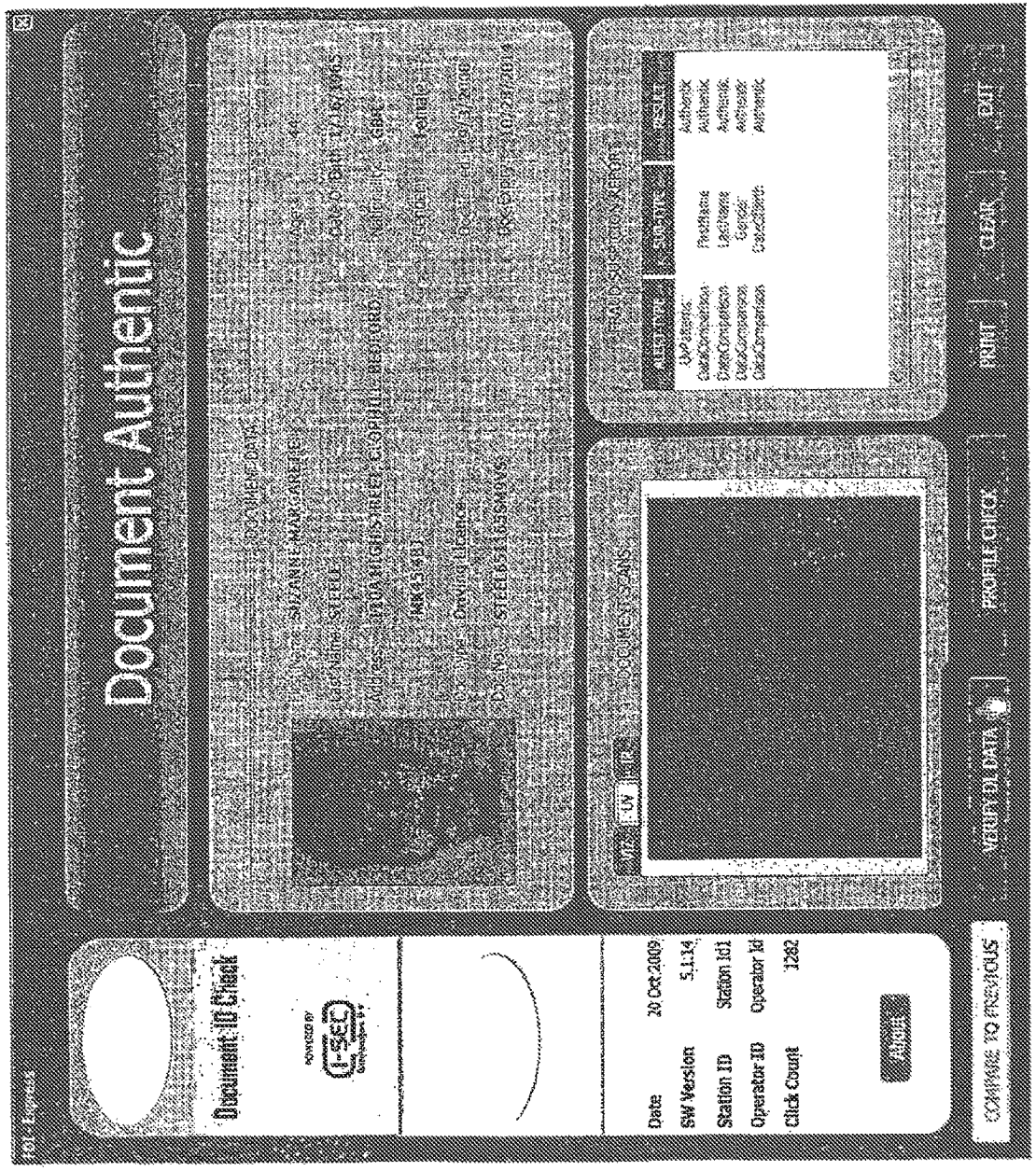
Figure 21:
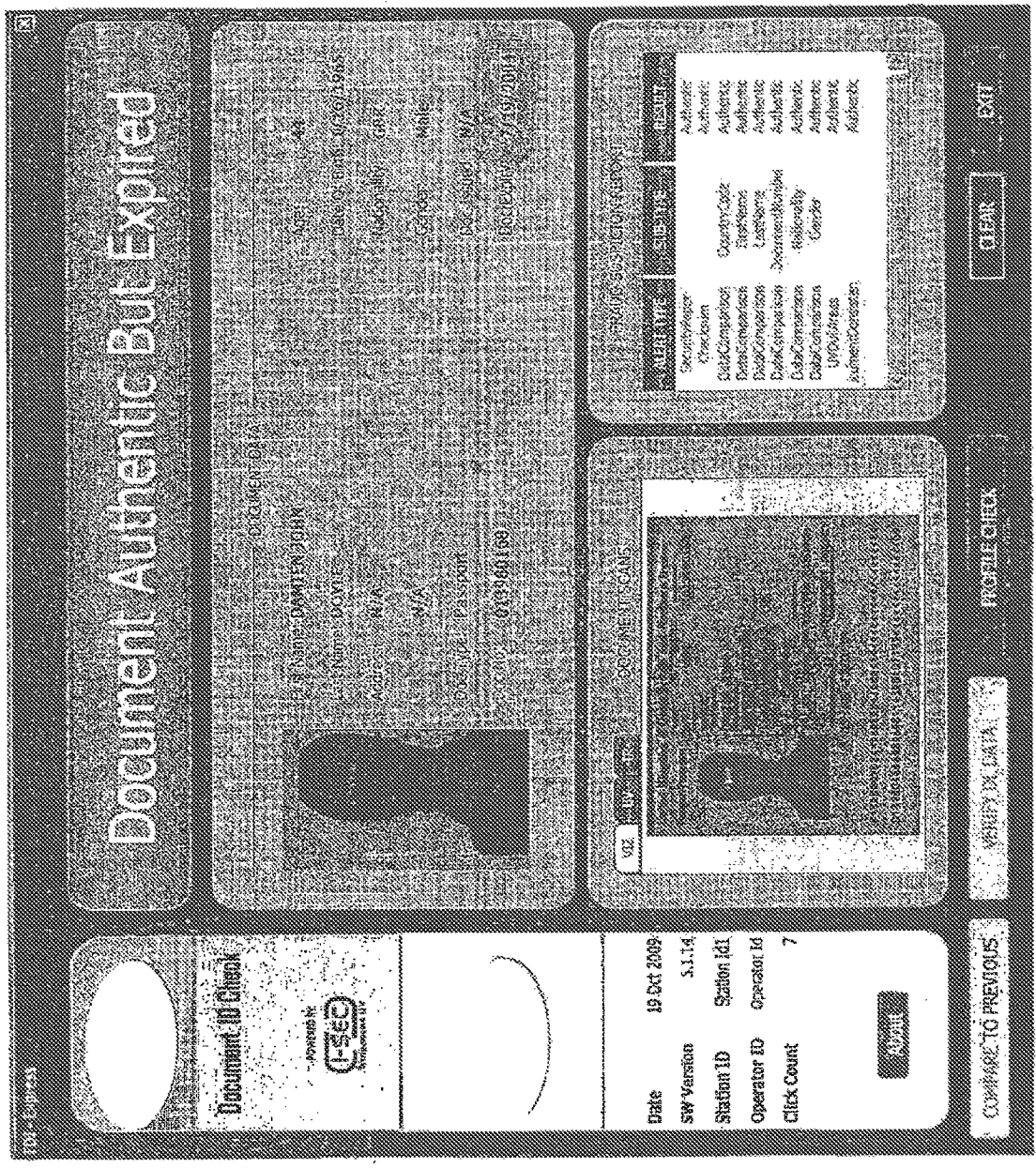
Figure 22:
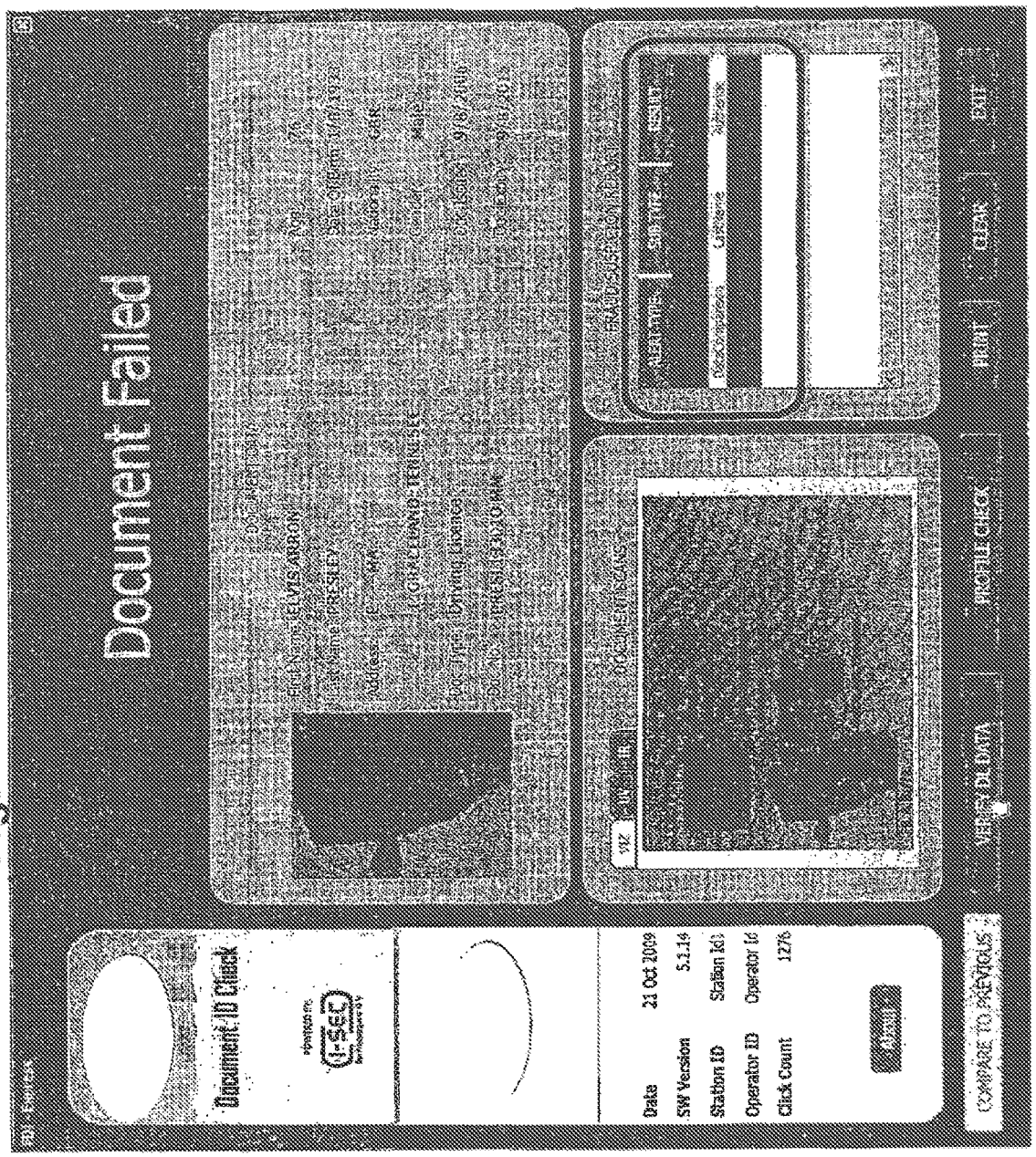
Figure 23:
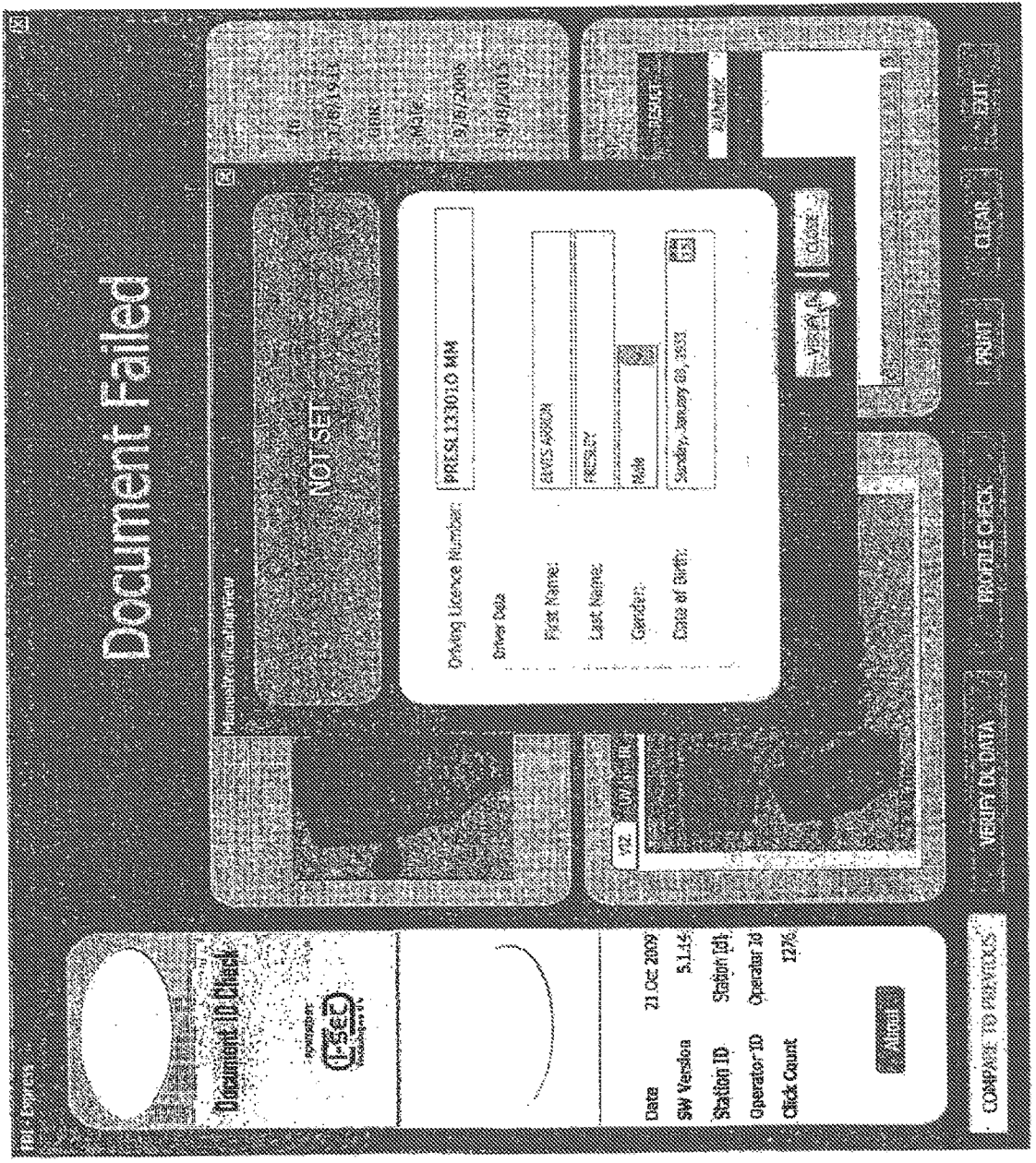
Figure 24:
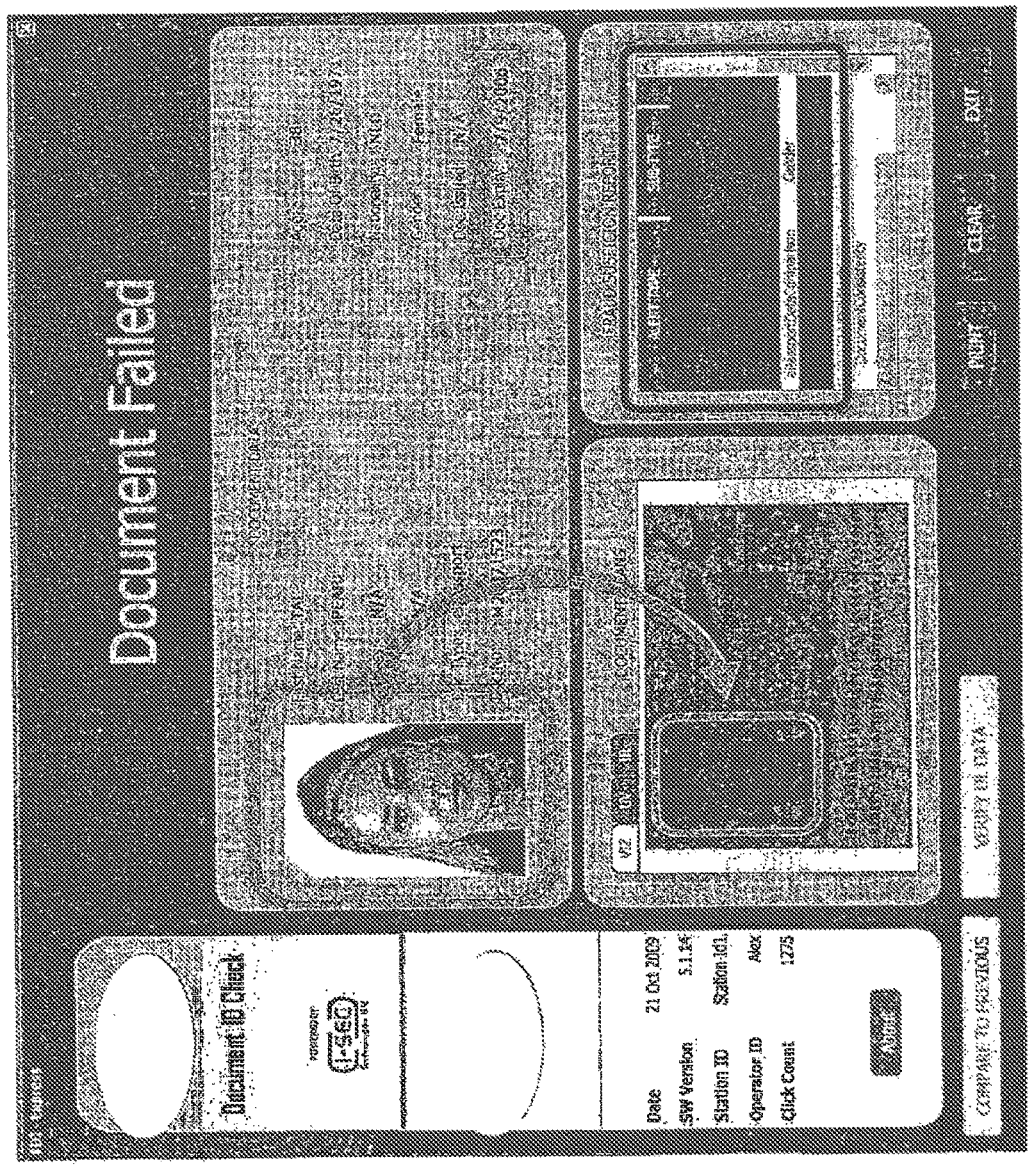
Figure 26:
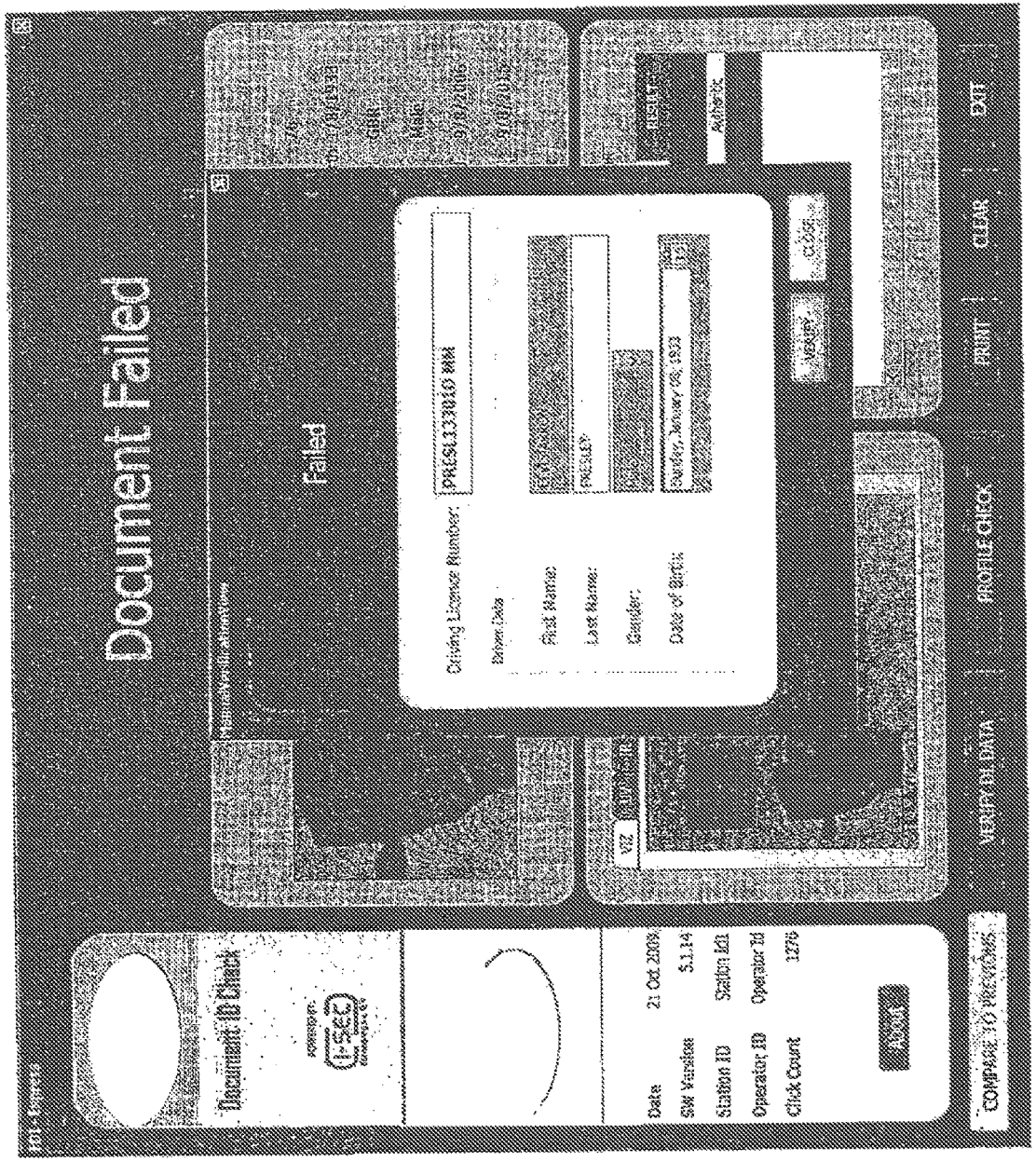

Typically, when using a system such as that described hereinabove, a document is simply placed on a suitable scanner, and a screen display clearly indicates its authenticity (or not), e.g. "document authentic" as in FIG. 16. IR and UV scans are visible, as shown in the screen displays of FIGS. 15 and 16 respectively. Other information is shown in FIG. 17. FIGS. 18-20 employ a different example document (a British driving license rather than a Canadian passport). Scans are shown, as well as verification of DL data (FIG. 20). FIG. 21 employs a different example document—a British passport which is authentic but has expired. As shown in FIG. 21, the screen display clearly indicates this. FIGS. 22, 23 and 26 are screen displays shown for a fraudulent British driving license. The screen display clearly indicates that the document has failed authenticity analysis. FIG. 24 is a screen display for a fraudulent Netherlands e-passport.

Figure 25:
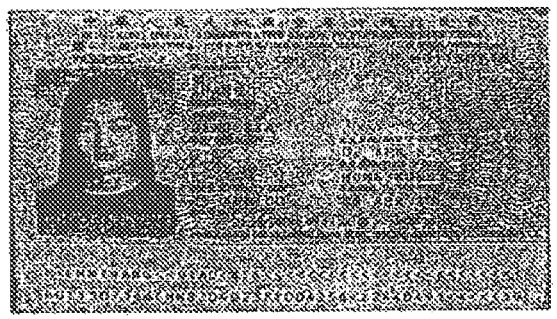

Example fraud detection methods are now described in detail with reference to FIGS. 25, 28 and 32. Forgery Detection for UV Patterns is now described. Typically, this includes document forgery detection techniques which include checking the travel document's paper response to the UV radiation, and the existence of security patterns in the document printed in UV Fluorescent ink, that can be seen in the visual wavelength range when excited with UV radiation. The methods described here are based on checking the visual luminescence of the paper under UV radiation, and on the recognition of patterns visible under UV radiation. The following definitions are employed:

Luminescence: The amount of light (photons) emission from a substance whose electrons have been excited. Luminescence is cold light, i.e. it is not conditioned by the rise of temperature.

Photoluminescence: Luminescence due to excitation by the adsorption of light.

Fluorescence and Phosphorescence: Subdivisions of photoluminescence. The distinction between them is not always obvious. Fluorescence results from excited singlet states of electrons, and its typical life time is about 10 nanoseconds or even shorter. Phosphorescence is the result of triplet excited states, and its typical lifetime is milliseconds to seconds, and even more.

UV fluorescence: excited by UV irradiation; IR luminescence: excited by visible light and emitted in the IR.

Fluorescent Probe (fluorophore): Fluorescent substance used to enable fluorescent measurement. Fluorescent probes can be divided into Intrinsic probes that already exist in the systems to be studied; and Extrinsic probes that are added to the system, and are to be either bonded or associated to the studied molecules.

Quenching: The decrease of fluorescence intensity due, for example, to the interaction with other molecules (quenchers).

Fluorescence spectrum: Data usually presented as emission spectra: A plot of fluorescence intensity vs. wavelength or wavenumber (reciprocal of wavelength).

Fluorescence is a member of the ubiquitous luminescence family of processes in which susceptible molecules emit light from electronically excited states created by either a physical (for example, absorption of light), mechanical (friction), or chemical mechanism. Generation of luminescence through excitation of a molecule by ultraviolet or visible light photons is a phenomenon termed photoluminescence, which is formally divided into two categories, fluorescence and phosphorescence, depending upon the electronic configuration of the excited state and the emission pathway. Fluorescence is the property of some atoms and molecules to absorb light at a particular wavelength and to subsequently emit light of longer wavelength after a brief interval, termed the fluorescence lifetime. The process of phosphorescence occurs in a manner similar to fluorescence, but with a much longer excited state lifetime.

Fluorescent compounds may be organic (typically aromatic materials), inorganic (ions, doped glasses, and some crystals), and organometallic materials. Fluorophores are characterized mostly by their fluorescence lifetime and quantum yield (ratio of number of photons emitted to the number absorbed). High intensity of lighting is employed, since the efficiency is usually low. In many analytical studies and uses, an extrinsic fluorophore is added to the system. For the identification of false documents this is not an option. Fluorescence may be very sensitive to the micro-environment of the emitting molecule. This is one of the main reasons for the usefulness of fluorescence as an analytical tool. Fluorescence provides temporal and spatial information. The intensity of fluorescence may be decreased (quenching) by many competing processes in the environment of the fluorophore.

Measurement of fluorescence is depicted as emission spectra. These are plots of fluorescence intensity vs. wavelength (or wavenumber). Two types of measurements can be made: steady state and time-resolved. The former is the common type of measurement, where the illumination and the observation are constant. The latter is used to measure decays, following exposure of the sample to a pulse of light. The pulse width is typically shorter than the decay time. The decay may be followed with a high-speed system, on the nanosecond time scale. The information gained is very advantageous; however the equipment is usually very complex and costly. At least the following two properties of fluorescence are useful for false document identification: (a) The same fluorescent emission spectrum is usually observed, irrespective of the exciting wavelength. There are only rare exceptions to this behavior. This implies that the wavelength of the light sources is less important—emphasis should typically be placed on the detector; and (b) Fluorophores may be selectively excited by polarized light. This opens possibilities for using polarized light.

A method for UV Security Paper Checking is now described. Under ultraviolet light, some papers become fluorescent in the visible range. Papers widely differ in the color of fluorescence. There is also fluorescence in the IR range, when papers are irradiated in the visible range. This has to be detected by photographic or electronic means. In special security papers, small pieces of paper or special fibers may be introduced into the paper as security markers.

The ICAO (International Civil Aviation Organization) has defined a set of security standards for machine readable travel documents (ICAO Doc 9303), including the following concerning UV Security Paper: "Materials used in the production of travel documents should be of controlled varieties and obtained only from bona fide security materials suppliers. Materials whose use is restricted to high security applications should be used and materials that are available to the public on the open market should be avoided . . . . Security features and/or techniques should be included in travel documents to protect against unauthorized reproduction, alteration and other forms of tampering, including the removal and substitution of pages in the passport book, especially the biographical data page. In addition to those features included to protect blank documents from counterfeiting and forgery, special attention may be given to protect the biographical data from removal or alteration. A travel document should include adequate security features and/or techniques to make evident any attempt to tamper with it." Moreover, when describing the paper forming the pages of the travel document, the ICAO standard indicates in the Basic Features that: "UV-dull paper, or a substrate with a controlled response to UV, such that when illuminated by UV light it exhibits a fluorescence distinguishable in color from the blue used in commonly available fluorescent materials."

Various fluorescent materials are used in various travel documents. The papers contain zones that are darker, known as UV-dull, and others that are seen in different wavelength colors. Glues, adhesive tapes, sealants, and (past) application of solvents or chemicals to paper may cause differences in fluorescence, resulting in different fluorescent luminosity and color (wavelength). FIG. 25 is an example of a non-security paper illuminated with UV lighting. Note that all the paper becomes fluorescent under the UV radiation in FIG. 25, which depicts a forged Security Paper. In order to detect security paper forgery, the method evaluates a Fluorescent Factor, defined as $$FF(R) = \frac{\sum_{x \in R} F(x)}{\sum_{x \in R} f(x)}$$

Where
R The region in the image to be checked.

F(x) The value of the pixel x with a color within the fluorescent range.
f(x) The value of a pixel x.

Typically, the factor maximizes when all the pixels in the region have been excited by the UV lighting. A document is accepted if the factor falls within an expected range for the type of document. Note that the value is independent of the intensity of the pixels in the region. In order to define the analysis regions and expected ranges for different types of documents, a statistical process may be employed to recover information from several thousands of documents in a large number of document types (different travel documents from several countries and authorized organizations). Also, in order to avoid exogenous factors (like kinds of scanners, quality of the lighting sources, quality of the document papers, and others), the same documents may be scanned using different scenarios. After extended tests, a reliable set of acceptance parameters was acquired, yielding to very low levels of FRR (False Rejected Ratio, when rejecting authentic documents) and FAR (False Accepted Ratio, when accepting forged documents), with emphasis on FRR, performance and tolerance to scan resolutions (by testing on different resolutions, from low-quality to high-quality), in order to provide a customer oriented tool.

Advantages of the method for UV Security Paper Checking described above may include one or more of the following: clearly identify security paper forgery, very fast, works with low resolutions, easy to set up and operate, works on a small area of the document image thus less sensitive to document physical condition, does not require complex pattern image processing and is capable of working with different illumination intensities.

Typically, a scanner with UV lighting capabilities is used and detection and acceptance parameters are defined per document type. The method is typically susceptible to background noise in the document image, for example, due to bad physical condition of the paper or low quality print. The method typically does not match the shape of the UV figure and instead only checks for existence of a security paper. Therefore, the above method is particularly suitable for a quick check of security papers. Also, when applied to specific regions in the document, it can also check for the existence of a security pattern, since the patterns use specific figures with a fixed amount of colored pixels.

Typically, the UV Security Paper Detection method described above checks the overall response of the document paper to the UV lighting. However, the method above only checks for existence of a security paper, and does not verify the existence of UV patterns formed by the use of UV fluorescent ink in the document. In order to verify that the correct UV pattern exists, detailed UV Security Pattern Recognition Methods may be employed. These are operative to check the colors and shape of the reflected UV figure (in the UV image) against a known UV pattern that is expected to appear in that specific document type. Since the UV pattern is known accurately, and also its location in the document is usually known, a template operator is applied to the document image, and the maximal match is evaluated to check if the UV Security Pattern (template) is found in the image. Possible versions of the template operator include the following two versions: (a) Color account, which evaluates the number of pixels within a color range in a certain area of the document; and (b) Shape recognition, which compares the UV image in the document against an expected security pattern.

The color account method compares the number of pixels within a color range, in a certain image region, against the expected number of pixels for this region, based on the type of the document. In order to properly account the number of pixels, some or all of the following steps may be performed, suitably ordered e.g. as shown:

1. The pattern and the image are normalized using the following Normalized Mean Squared Error operation: Let $\mu_a$ be the mean intensity of image a. The mean of the image is first normalized to 0 by scaling the intensity of each pixel of a as $$a'_{x,y} = \frac{a_{x,y}}{\mu_a} - 1$$

Let $s_{a'}$ be the standard deviation of the new image a'. The intensity of each pixel in a' is further scaled as $$a''_{x,y} = \frac{a'_{x,y}}{s_{a'}}$$

The resultant image a" is this of standard deviation 1.

2. The pixels in the non-fluorescent range are subtracted from the image using Non-Fluorescent Color Subtraction which changes the color of all the pixels not in the range of the visible fluorescent emission spectrum to black, and so removing all the objects of the image that are not to be considered in the pattern matching. If v(x) is the image after subtracting the non fluorescent pixels from an image $f(x)$, then $$v(x) = \begin{cases} f(x), \text{ when } f(x) \in [\tau_0, \tau_1] \\ 0, \text{ if not} \end{cases}$$

where $\tau_0$ and $\tau_1$ define the boundaries of the visible fluorescent emission spectrum and 0 represents a black pixel. These values are dependent on the type of fluorescent ink chosen for the document. Non-fluorescent color subtraction typically comprises a process of Subtraction of non-Fluorescent pixels.

3. After subtraction, a Fluorescent Factor is evaluated for the resulting image, as described above.

Advantages of the UV Security Pattern Recognition Methods described above may include some or all of the following: it is fast, it works on different resolutions, it is not affected by the rotation of the image, it does not require a pattern, and it is able to check differences in color of the fluorescent pictures. These methods typically require UV illumination, do not effectively check the shape of the pattern, typically require external parameters for each type of document, and can be affected by the light produced with different scanners, since not all UV lenses in scanners have exactly the same characteristics. Therefore, these methods are useful as a fast checking method of UV security patterns on documents.

Binary Cross Correlation Factor: The Binary Cross Correlation Factor is a computational operation applied on the image information in order to check for existence of UV patterns. It is based on the correlation between a function and a pattern. In order to provide a less complex method that takes less time to compute and be less sensitive to differences in scans (different hues, differences between scanners, etc.) the color UV image is transformed into a black & white image.

One standard similarity between a function $f(x)$ and a template $t(x)$ is the Euclidean distance $d(y)$ squared correlation, given by $$d(y)^2 = \sum_x [f(x) - t(x-y)]^2$$

where $$\sum_x$$

means $$\sum_{i=-M}^{M} \sum_{j=-N}^{N},$$

for some M, N which define the size of the template. If the image at point y is an exact match, then $d(y)=0$; otherwise, $d(y)>0$. Expanding the expression for $d^2$, the expression is seen as $$d(y)^2 = \sum_x [f^2(x) - 2f(x)t(x-y) + t^2(x-y)]$$

Since $$\sum_x t^2(x-y)$$

is a constant term it can be neglected. Also, $$\sum_x f^2(x)$$

is approximately a constant, and it too can be discounted, leaving what is called the cross correlation between $f$ and $t$:

$$R_{ft}(y) = \sum_x f(x)t(x-y)$$

This value is maximized when the portion of the image under $f$ is identical to t.

If the template t and the image $f$ are binary functions (that is, black and white pictures), the maximum value of $R_{ft}(y)$ is the total number of pixels in the template t. Moreover, the $R_{ft}(y)$ can be further simplified by introducing the XOR operator $\otimes$ between $f$ and t, that yields 1 when $f(x)=t(x)$, and so a binary cross correlation is given by:

$$B_{ft}(y) = \sum_x f(x) \otimes t(x)$$

The binary cross correlation factor is determined by the ration between $B_{ft}(y)$ and the size of the template, $$F_{ft}(y) = \frac{B_{ft}(y)}{S_t}$$

where $S_t$ is the size of the template (number of pixels). The template is shifted across the image in different offsets (values of y), the superimposed values at this offset are "XORed" together, and the products are added. The resulting value is entered in a "correlation array", whose coordinates are the offset attained by the source template. The maximum value in the correlation array indicates the expected offset of the template in the image. Here, the correlation array has a maximum of 8 in 1, 2 offset, yielding that this is the position in the image where the best match was found for the template. Since the objective of the method is to compute the best match for the template, and not establish its position in the image, there is no need to build a correlation array, but only to return the maximum correlation value and compare it with a predefined acceptance value (threshold).

Pre-Filtering: The correlation measure employs binarized (black and white) images of both the original security pattern and the region in the document to be checked. Also, because the measure is highly affected by bright noise (light spots), the shape of the object, its size, orientation, or intensity values, it transforms (filters) the image before applying the pattern recognition method (another option is to apply a normalized correlation, which is less sensitive to the image characteristics than the correlation, although sensitive to the signal-to-noise content of the images and more costly in computing resources). The following transformations are applied to the image to be checked:

Non-Fluorescent Color subtraction, to remove the pixels in the image not in the range of visible fluorescent emission spectrum described above, Edge Detection, to detect the borders of the objects in the image, and Binarization, to normalize the image to binary values allowing applying the binary cross correlation computing.

Edge Detection (step b) is a transformation which detects the boundaries of objects in the image, obtaining a clearer image of the objects to be analyzed. Edge detection may be effected by approximating the gradient operation on the image function (i.e. the image data). For an image function $f(x)$, the gradient magnitude $s(x)$ and direction $\phi(x)$ can be computed as:

$$s(x)=(\Delta_1^2+\Delta_2^2)^{1/2}$$

$$\phi(x)=\tan^{-1}(\Delta_1/\Delta_2)$$

where $$\Delta_1=f(x+n,y)-f(x,y)$$

$$\Delta_2=f(x,y+n)-f(x,y)$$

n is a small integer, usually unity, called the "span" of the gradient. Given a UV image, after subtracting non-fluorescent color pixels, before and after applying the Edge Detection transformation, the colors in the resulting image are a representation of the distinct gradient magnitudes in the image.

Binarization (step c) is a transformation which reduces the color depth of an image to a binary level: black and white, by applying a binarization over an image function $f(x)$ computed as:

$$b(x) = \begin{cases} 0, \text{ when } f(x) < T \\ 1, \text{ if not} \end{cases}$$

where T is the threshold to be used to differentiate between black and white, generally defined as the middle value of the color range. When binarization is applied to a UV image after applying the edge detection transformation, it can be seen that the pattern is clearly delineated in the resulting image.

A typical forgery detection procedure according to certain embodiments of the present invention is now described. In order to detect forgery by checking UV security patterns, some or all the following parameters may be determined according to the type of document. This may be done manually for each document type and version, since each pattern has its own specific characteristics including the location of the pattern, most prominent parts of the pattern, etc. Parameters to be determined may include: Pattern: the security pattern to be checked. This image may have been previously transformed with non-fluorescent color subtraction, edge detection and binarization.

Check area: the position of the security pattern in the document (top, left, width and height).

Fluorescent range: the spectrum range of the visible fluorescent pixels (this value may also be affected by the kind of scanner being used), and Threshold: the acceptance value for binary cross correlation.

Figure 28:
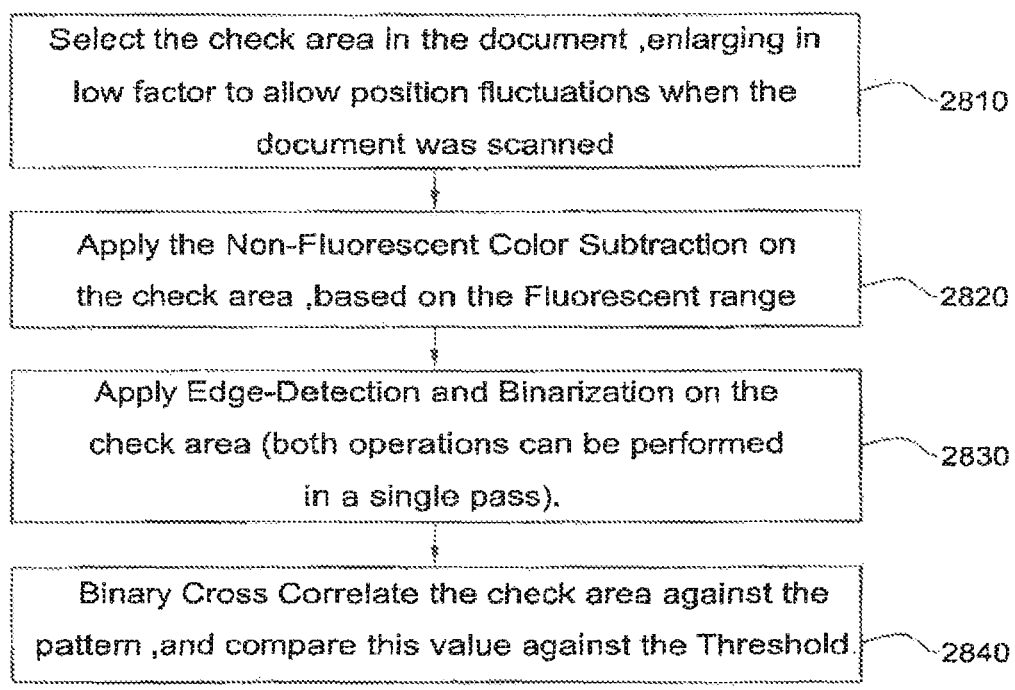

The detection method typically comprises some or all of the following steps, as shown in FIG. 28, suitably ordered e.g. as shown:

Step 2810: Select the check area in the document, enlarging in low factor to allow position fluctuations when the document was scanned.

Step 2820: Apply the Non-Fluorescent Color Subtraction on the check area, based on the Fluorescent range.

Step 2830: Apply Edge-Detection and Binarization on the check area (both operations can be performed in a single pass).

Step 2840: Binary Cross Correlate the check area against the pattern, and compare this value against the Threshold.

The methods described herein are suitable for detecting UV security paper and UV security patterns, by verifying the response of the paper to UV radiation, and recognizing patterns in predefined locations in the document. It is believed that the use of Fourier metrics can lead to improvements in the comparison methodologies. Using UV typically requires a special scanner capable of scanning UV illumination, and also statistical data recovered from a population of travel documents, in order to suitably define the parameters employed by the methods.

Forgery Detection based on IR Ink analysis is now described. Such a document forgery detection technique is operative for checking that information in a travel document has been printed using special security ink (B900), against other printing techniques like Inkjet, Thermal Wax or Laser. The methods described here are based on the special characteristics of security ink, which absorbs light at the infrared 900 nm wavelength, compared to other inks or dyeing methods used for printing, which have various measures of reflectivity. A number of alternative detection methods are described herein.

B900 ink is an ink which absorbs light in the 900 nm wavelength range (near-infrared). This ink, which is usually made from carbon material, is used as a security feature in passports and other identity or travel documents, as a measure against photocopying or digital duplication, as described in ICAO doc9303, Part 1, Section III Paragraph 15.1. The physical characteristics of the ink are such that it absorbs near-infrared light with a wavelength of 900 nm, thus delivering a black color under 900 nm illumination. Security-enabled scanners can scan such a wavelength. Since regular paper inks and dyes, as well as the paper used in printing processes reflect the near-infrared wavelength, the result is that information printed using B900 ink appears black, whereas other colors, including the paper itself, reflect light (resulting in white or light grey color).

Travel document scanners which support near-infrared illumination scan the document with special IR-emitting LEDs, resulting in a black & white image where the special ink appears in black and the rest of the document appears in white (or light grey). This is done at a wavelength not visible to the human eye, using special equipment for scanning. Combined with the use of special character set (OCR-B), and the ISO 1831 requirement that any other security features shall not interfere with the accurate reading of the OCR characters in the B900 range, this provides not only a means for detection of forgeries, but also an aid for more accurate machine reading of the data printed on the document, since the contrast between the black characters and the white background greatly assists the OCR engine, in addition to filtering-out background graphics and colors—that appear as an homogeneous "white" background.

IR Scanning Techniques: Special scanners are used to scan light reflected from a travel document at the 900 nm wavelength. These sophisticated scanners employ an array comprising a light sensitive sensor with visible light, IR and UV light sources. A mechanism for fast switching of light sources and of sensor sensitivity, using mirrors, is typically provided. FIG. 1 of U.S. Pat. No. 7,046,346 describes a light source/sensor coupling technique common with IR/UV scanners. The IR LED light is reflected through a mirror to illuminate the scanner plate. The light reflected from the document is focused using the lens onto the sensor. In order to avoid reflections from the light source on the sensor, the light source emits away from the sensor. In addition, in order to reduce reflections from the glass plate on the sensor, as well as to improve readability by the sensor, an optical filter is positioned between the lens and the sensor to filter out UV spectrum reflections.

As described, the IR-able scanner delivers a black & white image. If such is compared to the original color, visible wavelength image to see how background graphics are dissolved in the IR image, it is apparent that the paper itself, together with any color graphics and text (except for text printed with B900 ink) returns an almost homogeneous luminosity, whereas the B900 ink does not reflect 900 nm light and appears black.

Spectral Analysis of the IR Image: Typically, in order to detect forgeries, the method analyzes the image information to see whether B900 ink was used in the MRZ (and VIZ data) print. As described above, most paper and general inks reflect light in the 900 nm wavelength vicinity, and only special inks provide black color in the IR image. This security measure is not visible to the human eye, since the 900 nm wavelength is out of the human eye visible spectrum, and therefore it is considered a coveted security feature.

Typically, cropping may be combined with straightening, as the technology itself is similar. Since the scans always show black stripes to the right and to the left of the scanned document, it is possible to take advantage of this knowledge and provide a very fast method for cropping. The method itself horizontally scans the sides of the image from the edge inwards for black pixels, until a bright pixel is reached. Repeating the scan in vertical interleaves can provide the location of the left and right edges of the document. By computing the distance between the edge of the document and the edge of the image, at each of the sampled locations, the vertical tilt of the document can be computed and straightened. Since travel documents are standard, after cropping the black side stripes it is also possible to compute a suitable crop at the top of the document, resulting in a final cropped image. The spectral analysis now appears different. Since the amount of pixels printed in B900 ink is relatively small, a small peak at the lower values can be seen, and most of the other pixels carry a medium-high luminosity level.

Binarization: Binarization is the transformation of the image from 256 shades grayscale into a pure black & white image. This way, only the "real" black pixels remain, thus enhancing precision of forgery detection methods described below. In a set-up stage, a large number of scanned IR images of passports may be analyzed, in order to find a threshold that reliably separates the first and the second ranges of IR reflections (black ink and white background). Using this threshold, a quantization method is applied to the image, and the quantization result is checked against the expected range in order to see whether the document is forged. In order to obtain a reliable threshold, the IR image that is received as a grayscale image is binarized (i.e., converted into B&W only image). Further enhancements to the image increase binarization quality, such as edge-detection. Image Binarization may use Frei and Chen Edge Operators and Despeckle Methods. When applied to the IR image, the binarization transformation includes Simple Binarization (50% Threshold) followed by Customized Binarization (37% Threshold). The optimized 37% threshold image displays the MRZ and VIZ information much clearer, and even helps by discarding medium-luminosity textual headings from the VIZ that may obstruct OCR methods in the VIZ region. Sharpening the image before binarization yields an even higher-quality binarization, with higher contrast (thus producing a higher threshold respectively).

Forgery Detection: One aspect of the IR scanning and optimizing is that the OCR engine works much better, yielding much better results on the IR image than the visual light image. Therefore, other methods of forgery detection such as MRZ checksums and MRZ-VIZ comparison also yield more reliable results. In addition, the binarized IR image can be analyzed for forgeries. When a non-IR absorbent (B900) ink is used to print a forged document, most of the scanned document image reflects light.

Binarization of the image of the forged document using sharpening+55% threshold results in a white image. When the amount of black pixels in the binarized image of an authentic passport is counted, the result is typically that 3-6% of the pixels are black. In contrast, the forged document shows less than 1% black pixels. This difference serves as a clear indicator to the lack of B900 ink use in the document printing process, thus indicating a forged document. Advantages of this method include high speed, reliability when used in high resolution scanning, un-affected by position or rotation, little influence from the physical condition of the document and the fact that no pattern image need be employed. However, IR inks are readily available, the B900 ink standard is publicly open and known, and the method typically employs a scanner able to scan at the near-infrared wavelength vicinity. The above is a suitable forgery detection method for use when working with IR scanned images.

In certain special cases, IR forgery detection is limited. For example, the Palestinian Authority travel document is consistently printed without using B900 ink. Therefore, if the document is recognized as a Palestinian Authority travel document, IR forgery detection is skipped. Also, some batches or series of French visas are also printed without using B900 ink, therefore yielding a blank image in IR illumination.

Irregular Documents are documents which do not conform to the ICAO 9303 standard with regard to the textual information on the document. Usually, these are either non-MRZ documents or national identification documents. One such document is the Israeli national ID card. Such documents present a different spectral spread in the histogram, and therefore the general threshold used to detect forgeries does not yield correct results.

ICAO Standard 9303 allows for the use of a 2D barcode for presenting information in an encrypted form. The barcode is printed in black on a relatively large portion of the document, and its use results in a different histogram than expected, thus delivering unreliable results of the IR forgery detection method. Since the number of documents known to employ this feature is not large, it is considered as an acceptable limitation in the functionality of the method.

The methods described above are operative for detecting forged travel documents by verifying that the document contains special B900 security ink which does not reflect light in the 900 nm vicinity. Using IR illumination adds the constraint that a special scanner, capable of scanning in IR illumination, is used. However, the result is a generic image analysis method that, when tested on many thousands of passports and other travel documents, yielded very reliable results.

Document forgery detection techniques operative for checking that the travel document has been printed using Offset, as opposed to other printing techniques like Inkjet, Thermal Wax or Laser, are now described. The methods described here are based on the smoothness quality of Offset Printing, compared to the discrete quality of printing based on the combination of very small basic color dots (dithering), as is done with other printing techniques. A number of alternative detection methods are shown, indicating their advantages, disadvantages and utility.

Offset printing is a widely used, sharp, smooth printing technique where the inked image is transferred (or "offset") from a plate first to a rubber blanket, then to the printing surface. When used in combination with the lithographic process, which is based on the repulsion of oil and water, the offset technique employs a flat (planographic) image carrier on which the image to be printed obtains ink from ink rollers, while the non-printing area attracts a film of water, keeping the nonprinting areas ink-free.

Inkjet Printing operates by propelling tiny droplets of liquid ink onto paper. Inkjet printers are the most common type of computer printer for the general consumer due to their low cost, high quality of output, capability of printing in vivid color, and ease of use. The dots produced by the droplets are very small (usually between 50 and 60 microns in diameter), and positioned very precisely, with resolutions of up to 1440×720 dots per inch (dpi). The dots can have different colors combined together to create photo-quality images. Although an inkjet printer can create quality pictures, when magnifying the printed image, the dots producing it can clearly be seen.

Thermal Wax Printing falls somewhere between dye-sublimation and solid ink technologies; thermal wax printing uses a wax-coated ribbon and heated pins. As the cyan, magenta, yellow, and black ribbon passes in front of the print head, heated pins melt the wax onto the paper where it hardens. Thermal wax printers produce vibrant color but may employ very smooth or specially-coated paper or transparencies for best output. Thermal wax printing technology works well for businesses that produce large quantities of transparencies for colorful business presentations. As with Inkjet Printing, when magnifying an image printed with Thermal Wax, the dots producing the image can readily be seen.

Laser printers employ a xerographic printing process, producing the image by direct scanning of a laser beam across the printer's photoreceptor. Compared to Inkjet printers, Laser printers have a higher resolution, no smearing, lower cost per page, and faster print speed. However, laser printers always produce raster images, and except in the highest-quality versions, are less able to reproduce continuous tone images such as photographs.

Dithering is a technique used in computer graphics to create the illusion of color depth in images with a limited color palette (color quantization). In a dithered image, colors not available in the palette are approximated by a diffusion of colored pixels from within the available palette. The human eye perceives the diffusion as a mixture of the colors within it. Dithered images, particularly those with relatively few colors, can often be distinguished by a characteristic graininess, or speckled appearance. Since non-offset printers use dithering to produce the colors (diffusing the image with very small color dots, in the order of tens of microns) as opposed to Offset printing which uses flat colors, checking for dithering is an effective way to detect forgery in travel documents. If magnified images in Offset and Inkjet printing are inspected, Inkjet printing clearly shows the red-green-blue dots used to produce the desired color.

In summary, forgery detection may for example be based on UV security paper checking, typically using at least one of UV security pattern recognition, a binary cross correlation factor, and spatial-frequency domain metric; on IR ink e.g. B900 ink checking, typically using binarization; and on offset printing checking, typically using at least one of dithering checking, pattern dispersion checking and printing continuity checking.

A VIZ full page reading application of the system of FIGS. 2-3 is now described in detail, the application being constructed and operative in accordance with certain embodiments of the present invention. The methods shown and described herein enable automatic reading of information from the visual inspection zone (VIZ) part of travel documents. The VIZ is not intended for automatic machine reading as opposed to the MRZ—but rather for manual visual inspection. Therefore, many problems arise when trying to process images of the VIZ part of travel documents with the travel document OCR reading module. For example, the international ICAO standard regarding travel documents allows for greater flexibility regarding information in the VIZ as compared to the strict rules of MRZ format, such as the precise format and placement of the information; use of localized information (only a limited alphabet is allowed in the MRZ); etc.

In order to overcome these difficulties, special methods intended for increasing the efficiency of VIZ readability are now described. The purpose of VIZ readability is to enhance security and increase the detection efficiency of forged travel documents. According to certain embodiments, minimal accuracy is 70% (one mistake in the most important VIZ information fields) when scanning common travel documents' VIZ for the following information: Issuing country, Document no., Given name, Surname and Date of birth.

Methods for handling the specific difficulties of VIZ reading may be based on analysis of the scanning and reading workflow. Operational experience in processing various types of travel documents may be utilized to identify and categorize factors and bottlenecks in the processing of the image information.

Figure 29:
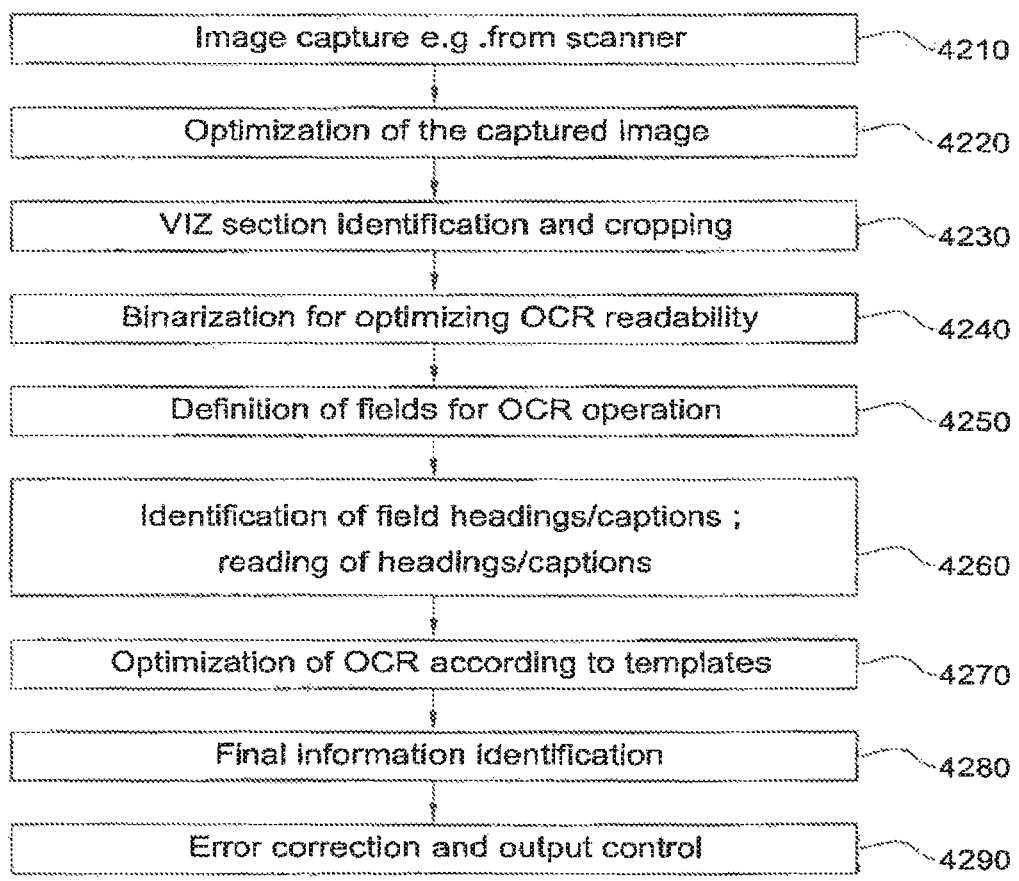
FIG. 29 is a simplified flowchart illustrating aspects of a VIZ full page reading application of the system of FIGS. 2-3, the application being constructed and operative in accordance with certain embodiments of the present invention.

Image processing may include several typically consecutive processes as shown in the simplified flowchart of FIG. 29. The method of FIG. 29 typically includes some or all of the following steps 4210-4290, suitably ordered e.g. as shown:

Step 4210: Image capture (from the scanner)
Step 4220: Optimization of the captured image
Step 4230: VIZ section identification and cropping
Step 4240: Binarization for optimizing OCR readability
Step 4250: Definition of fields for OCR operation
Step 4260: Identification of field headings/captions; reading of headings/captions
Step 4270: Optimization of OCR according to templates developed specifically for travel documents previously encountered and analyzed for template extraction, in a set-up stage and/or as document intake is ongoing.
Step 4280: Final information identification.
Step 4290: Error correction and output control Certain embodiments of the method of FIG. 29 are advantageous vis a vis scanning and/or reading with regard to level of quality and/or processing time. Example implementations for the steps of FIG. 29 are now described in detail.

Step 4210—Image Capture: Image capture is performed by a high-quality travel document scanner. The scanner is connected to the software application via the manufacturer's SDK module, which returns an image (in JPG, TIFF or other format). For best readability results, the highest quality image is employed and therefore a TIFF format file is used.

Step 4220—Image Rotation: Since the final application of this technology is intended for use by immigration personnel, further consideration may be taken into account, such as the real-life situations of travel document scanning. Since real-life scans are not performed in a lab by travel document professionals, some mistakes may be made, for example, misplacing of the travel document on the scanner pane. This may provide a skewed scanned image, whereas the OCR and the optimization methods expect to receive a straight image. In order to overcome these difficulties, the captured image may first be rotated.

Rotation of the image is performed by detecting any difference between the black stripe surrounding the document and the luminosity reflected from the travel document. This type of method is called "contrast detection". Using this method, it is possible to detect the angle at which the document is placed, and using this information each pixel is displaced on the document accordingly, to straighten the document.

Step 4240—Binarization: Due to the complexity of their computations, OCR engines work on black and white images only, i.e., a 1 bit plane per pixel. The process of transferring an image from color or grayscale to black and white only is called "binarization". Correct binarization is essential to optimize the performance of OCR engines and for the correct reading of the information from the scanned image. A good binarization output retains as much pixel information in the informational part of the image (i.e., black) while discarding background images and noise as the background part of the image (i.e., white). The IR image of the travel document is used as input for the binarization process, since this discards most of the background graphics and colors in the travel document. The useful information is usually printed using special IR absorbing ink, highlighting the desired information. If recognition is not successful using the IR image, the visible image can also be used for recognition. In this case, the binarization process is even more crucial to the successful recognition of the document.

Vast differences exist between the luminosity values of the scanned images of passports issued by different countries, and even between passports issued by the same country. Many factors influence the scanned image, such as light conditions surrounding the scanner, the type of the document scanned and its physical condition, etc. By testing many binarization methods, a single solution may be reached that performs best as a standard binarization template, i.e., delivers the best results in the aggregate. The binarization method analyzes the average luminosity values of the scanned image and sets an RGB value that separates blacks and whites in a manner that best represents the written information in the scanned image.

The large variance in document luminosity may be problematic. Therefore, typically, a clustering method is used in an attempt to find the optimal binarization setting. The test criterion for stopping the clustering method may be the resulting percentage of black pixels in the resulting B&W image. If the percentage of black pixels in the image is within a specified predefined range, the method may stop. Otherwise, it would raise or lower the color threshold accordingly and test again. A maximum of, say, 7 steps are allowed, to prevent the method from going into an endless loop in some cases. Even using this approach there still may be a few different document types that would benefit from different final percentage settings. Therefore, in order to enhance reading quality, several different binarization methods may be used, and the reading engine may choose the method that provides the best results (the fewest errors from the OCR module).

The output of the binarization method is a black and white only image, where the written information is presented in the best quality that can be achieved for the specific scan. Binarization may include several "tries". For example, in a first try the binarization method may produce poor results. The threshold may for example be too low, resulting in the text being blurred and unclear, which would then lead to very low reading accuracy. The second try, corrected for this, may produce much better results, which drastically improve the reading accuracy.

OCR Processing—step 4250: After binarization, the B&W image of the VIZ is fed into the OCR engine. The OCR method used here is different than the one used for MRZ reading, since the character set, as well as the font used, are not standard (as is the case of the fixed font and size of the MRZ). Greater variation in character sets (non-English letters such as: Ä, Æ, Ô, Ñ and even non-Latin letters such as Cyrillic, Chinese, etc.) lead to decreased accuracy of the OCR methods, which deal with more a complex variety of letters. Typically, high-quality scans are employed, as high-resolution images assist in the recognition of the differences between the letters.

In addition, where the information fields can be identified and the expected type of information is fed into the OCR engine (such as names [test], dates [numerals], etc.) the reading quality is much higher, as the OCR has to cope with fewer variants in the information processed. The OCR engine may be optimized for processing flowing text containing different character sizes, fonts and character sets. A lexicographic dictionary may be used for increased accuracy. A de-speckle filter may be utilized for removing small artifacts in the resulting image. Post processing is performed on the results from the OCR to improve results according to field type. For example, date fields usually adhere to specific date templates such as:

DDMMYYYY
MMDDYYYY
DDMMYY
DD-MM-YY
DD/MM/YY
DD MMM YYYY
DD, MMM YYYY

The system attempts to fix the recognized information according to these templates and to the possible character set in these fields. For example, DD can only be a value from 1-31, and so on.

Step 4260—Handling Field Headings/Titles: A major obstacle in VIZ reading is the separation between the printed personal information of the document holder and the field headings/titles. If the information is NOT printed over the headings, then the only problem is separating the actual information from the headings. This is usually straightforward, since most field headings are standard (surname, given name, date of birth, date of issue, etc.) If the field headings and the actual information overlap, then the recognition method may separate them. Usually, field headings or titles are written in very small fonts, consequently in this case the method may disregard very small letters. The threshold size may be determined by analyzing numerous documents to measure the size of their field headings and the actual information. Overlapping leads to greater dependency on the results of the IR scanning and the binarization methods.

Attributing Information to the Correct Field: Since not all travel documents adhere to the ICAO standard in the VIZ area, sometimes information may appear at unexpected locations in the image. Successful recognition of the information is not enough since the correct meaning may be attributed to the information. If field headings/titles are present, they are read and compared to the list of "known headings", and then used to identify the various parts of the personal information. A complex comparison mechanism is used to compare even partially read headings.

Step 4270—Use of templates in the event that No Headings Can Be Identified: In the event that the field headings cannot be identified, the information in the VIZ is divided according to pre-defined templates. The templates are based on the ICAO standard together with modifications for specific countries and document types. The issuing country and document type can be derived from the MRZ information to signal implementation of specialized country-specific templates. Using such pre-defined templates allows the application to "expect" certain values at certain areas on the image. However, results may vary. Some countries use a uniform and mostly consistent template when manufacturing a travel document. This is usually the case with more "sophisticated" travel documents, those that employ more security and anti-tampering/forgery features. Documents issued by different countries, or other versions of the same passports or other travel documents all issued by the same county, may be more prone to variations in manufacturing, such as absolute positioning of the informational fields with respect to the fields allocated for them (text that extends out of bounds).

Step 4280—Processing using knowledge re which Information Can Be Expected in the VIZ. According to the ICAO standard, the following information is included in the VIZ (as well as extra information that is less relevant): Issuing country (*), Type of document, Document number (*), Primary identifier (name) (*), Secondary identifier (name) (*), Date of birth (*), Personal number (not always presented), Gender, Place of birth, Date of issue of the document and Date of expiration of the document (*). The fields marked with an asterisk (*) are typically those containing the most important information for passenger identification.

As described above, in order to provide for VIZ reading, FIG. 29 includes several steps to optimize reading quality while maintaining a reasonable processing time. In an implementation developed using a C++/Java environment, the total processing time for the scanning of the travel document and the processing of the information was usually not more than a mere 2-4 seconds. After the image is captured by the scanner, it is fed into a binarization engine that converts it to a black and white image optimized for recognition by the OCR. The image is subsequently fed into the OCR engine, using a template "informing" the OCR engine where to look for the information. According to certain embodiments, a computerized system based on the method of FIG. 29 is provided that is able to recognize VIZ information according to the predefined criteria.

Figure 27:
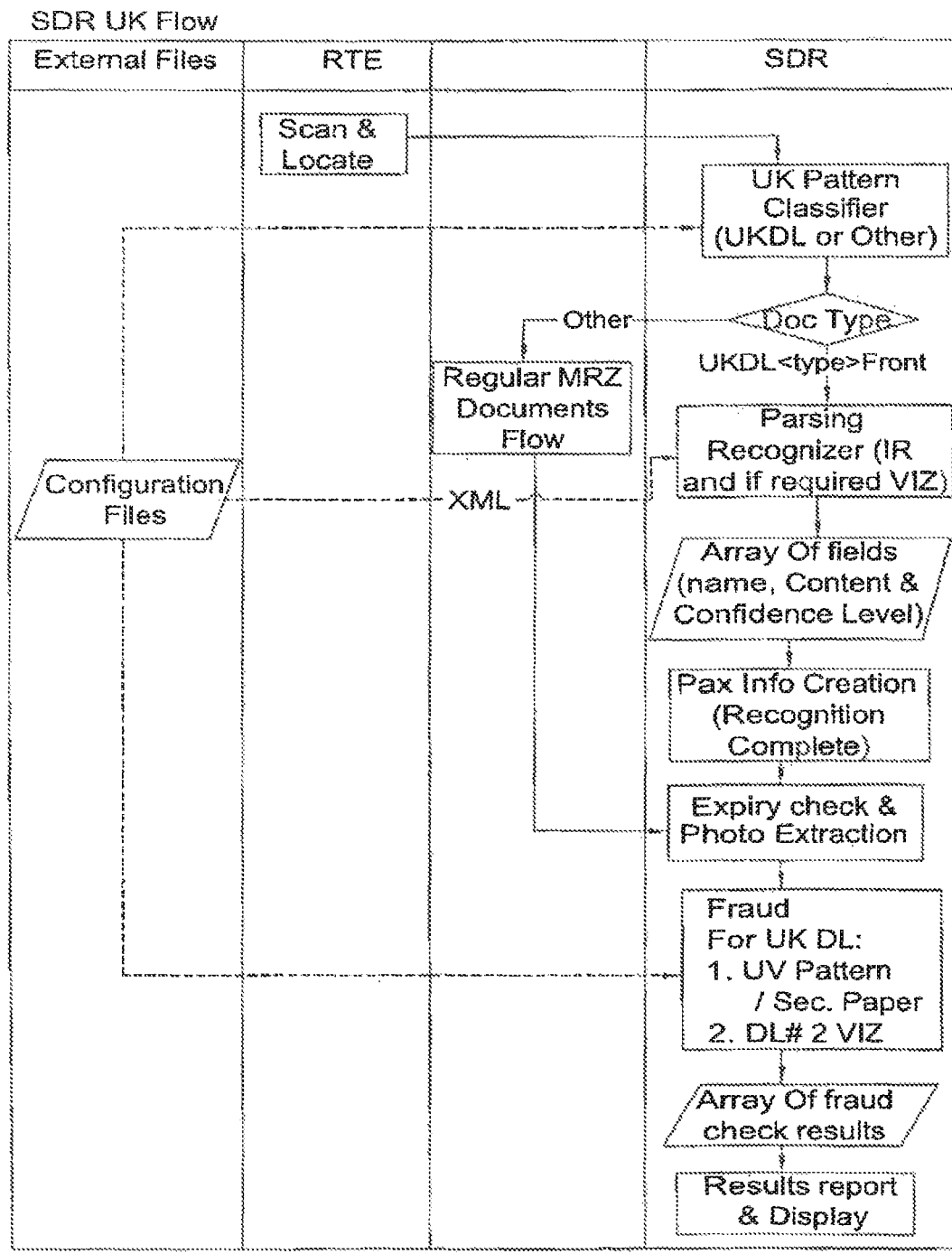
FIG. 27 illustrates aspects of a British driving license authentication application of the system of FIGS. 2-3, the application being constructed and operative in accordance with certain embodiments of the present invention.

A British driving license authentication application of the system of FIGS. 2-3 is now described in detail, the application being constructed and operative in accordance with certain embodiments of the present invention. The SDR internal flow is described in the diagram of FIG. 27. Functionalities may include some or all of the following:

1. RTE Scan & Locate.
   The locate capability of RTE is not sufficient to conform with British DL requirements, it cuts the images not sufficiently accurately.
2. Classifier:
   a. Classifies the two British documents and may reply 'Un Known' to any other document, RB32 is also identified as RB30, but apparently is in order because it is the same document.
   b. Down the road—merge with the Spanish classification to form a unified classification for the supported does of SDR5, optionally may use configuration file in order to be tuned during the application upon additional documents accumulated.
3. Regular MRZ document flow:
   Upon the above, classifier classifies document as unknown. The traditional SDR flow may act on that document (assume it is a passport in this case) including the traditional Crop & Rotate (which is not used for British DL).
4. Parsing recognizer—
   a. Uses configuration files that specify every document attributes, content fields, their coordinates and the other characteristics.
   b. Receives document (British DL) type.
   c. Every field or line is accurately identified and sent to the TOCR in a very accurate rectangle.
   d. Returns a vector of fields every field name, value and confidence level.

5. Fraud—UV Pattern
   a. Comparison of a designated area/s in the UV image for predefined UV patterns.
   b. Use configuration file in order to be tuned during the application upon additional documents accumulated.
6. Fraud—DL #2 VIZ
   a. Check consistency between the names, DOB & DL# fields according to the DVLA definitions in accordance with application-specific format and requirements.
   b. This functionality may be exposed in a separate component as well to be used in the SDR client outside the SDR.
7. SDR XML file & Images
   SDR may save the customer scan's XML data & images to the local disk. Later on the files may be used offline for scan counting and analysis. The files may be saved in folders structure as directed by the SDR client.
8. SDR Configuration files:
1. SDR Client—FDI Express: The application uses an SDR Client called FDI Express which is based on the SDR .NET Client, but has been developed ever since. The goal is to create a stable, simple and representative application. It is a main single screen application with WPF based GUI. Functionality and screen snapshots are typically as defined by the application. In addition to this straightforward functionality described in the above, the SDR Client may stand up to the following-Data saving, as described below.
2. Keep a log file—Using Log4Net.
3. About screen with Versions and access to the Logs (of SDR and FDI-X).
4. The Left side images (FDI/ISEC Logo and Customer Logo) can be switched externally without the need to build a new version.
5. Display the Station ID and Operator Name. Station ID is stored in configuration file, Operator Name is inserted by the operator upon starting the FDI-X.
6. SDR Watch dog—a thread that may handle the cases of SDR getting stuck and restart the SDR.
7. Full error handling to avoid customer embarrassment and enable debugging.
FDI-X Configuration Files may include some or all of the following:
1) Configuration.xml—SDR Configuration
2) ProfileCheck.xml—FDI-X Profile Check specific Configuration
3) Log4NetConfig.xml—log4net Configuration
4) ClientData.xml—contains ScanningCounter, StationIdentifier,
5) ClientToken.xml—which is a private key
2. Data Saving Issues: The FDI-X may support data saving for Log and debriefing purposes. The Data may be stored in XML Files (and Images as image types according to configuration) the FDI may use SDR existing saving capabilities and add its own when desired. The data may be saved in a manner that enables collecting the data and automatically accumulate it in a CSV/Excel/DB in order to analyze it later on. Saved Data may include some or all of the following:
   1. Customer Check data—Date & Time, Branch ID (Station ID), Computer name, Staff member name, Check result (Text on the Bar and its color), Check full results (the various checks results).
   2. Customer Data—All the data extracted from the document, explicitly—Names, DOB, Document number, Dates, MRZ when applicable.
   3. Images
      External Check Data—Type of check (URU\UID\Amberhill WL); Check input data (The exact data that was sent), Output/Result.Testing functionalities may optionally be provided. Testing document Link TB. An external remote access application may be employed to approach the application stations, check logs and images, and update versions, inter alia.

Figure 30:
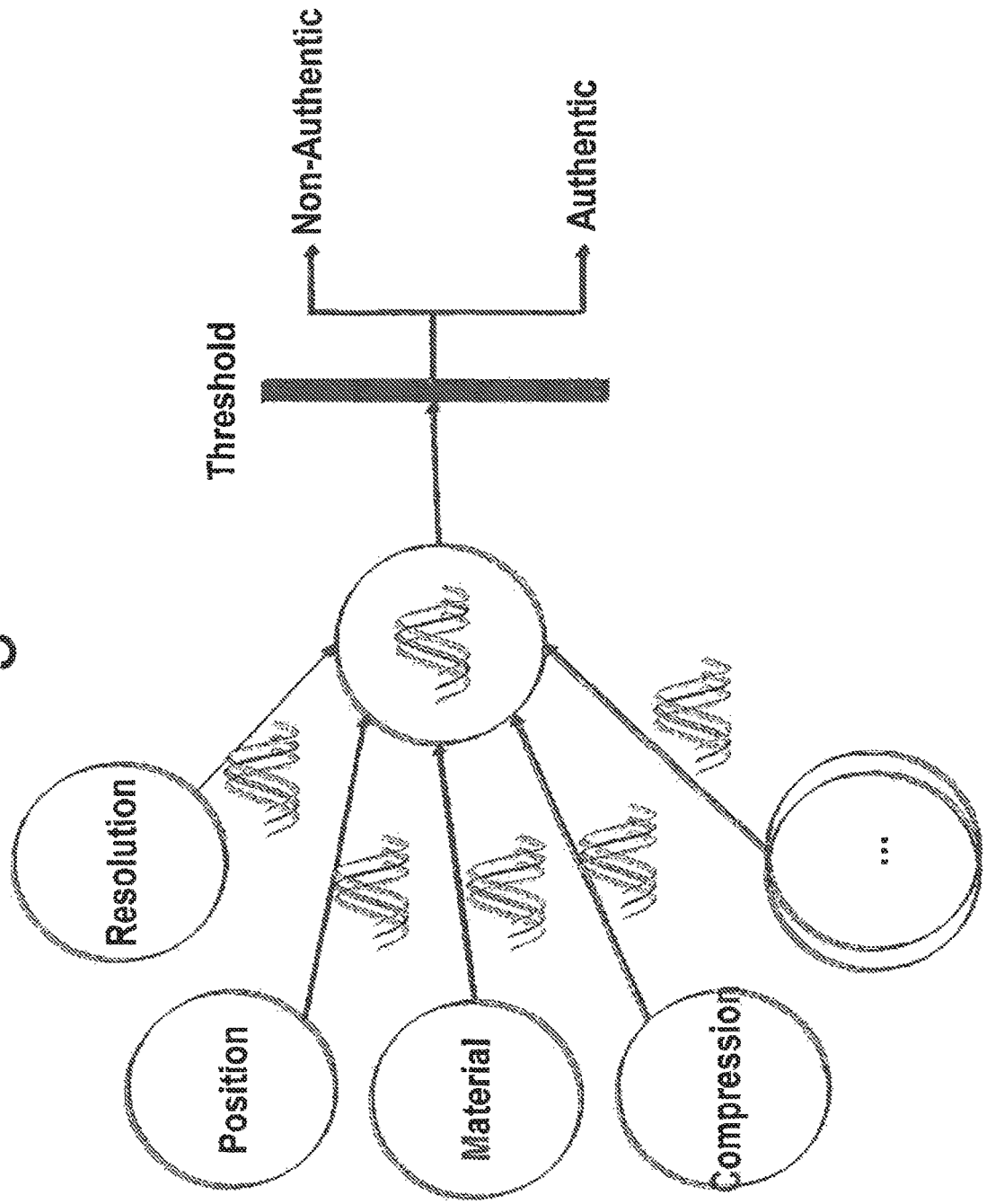
FIG. 30 is a diagram of a method for generating an indication of whether or not a scanned document is authentic, according to certain embodiments of the present invention.

FIG. 30 is a diagram of a method for generating an indication of whether or not a scanned document is authentic, according to certain embodiments of the present invention. As shown, document characteristics such as but not limited to resolution, position, material and compression characteristics are determined, measured, or otherwise provided, and thresholding eventually yields the desired binary decision re the document being either authentic or non-authentic. Typically, as shown, the method uses information regarding the position of each of the characteristics of an individual document to be authenticated, along a bell curve describing the distribution of the same characteristic in a population of previously scanned and analyzed documents to which the individual document is thought to belong. Typically, information regarding a particular document is derived from contour measurements of the document rather than from a full image of the document.

According to certain embodiments, a set of predefined tables are stored in a computer memory, each representing a function, typically Gaussian, related to the document type (e.g. passport, ID card, driving license) and/or document origin e.g. country which issued the document. Each of the tables is associated with a predefined set of rules, also in computer memory, which defines weighted results per each possible input, based on accumulated and analyzed information gathered over an information gathering time period.

Each scanned document is typically associated with a document type and origin. The document is measured and checked using various computerized procedures, such as but not limited to a resolution measuring process, a material checking process, and a compression measuring process. Each such procedure provides a result that serves as input to the system such as a resolution result, a material-indicating result, and a compression result, respectively.

Each of the parameters receives a weighted result based on the input it has received, respectively. All such results are typically 'blended' again, using suitable weights, thereby to provide a weighted final result. This final result is compared to a pre-defined threshold, in order to determine whether the document is or is not authenticated.

Figure 31:
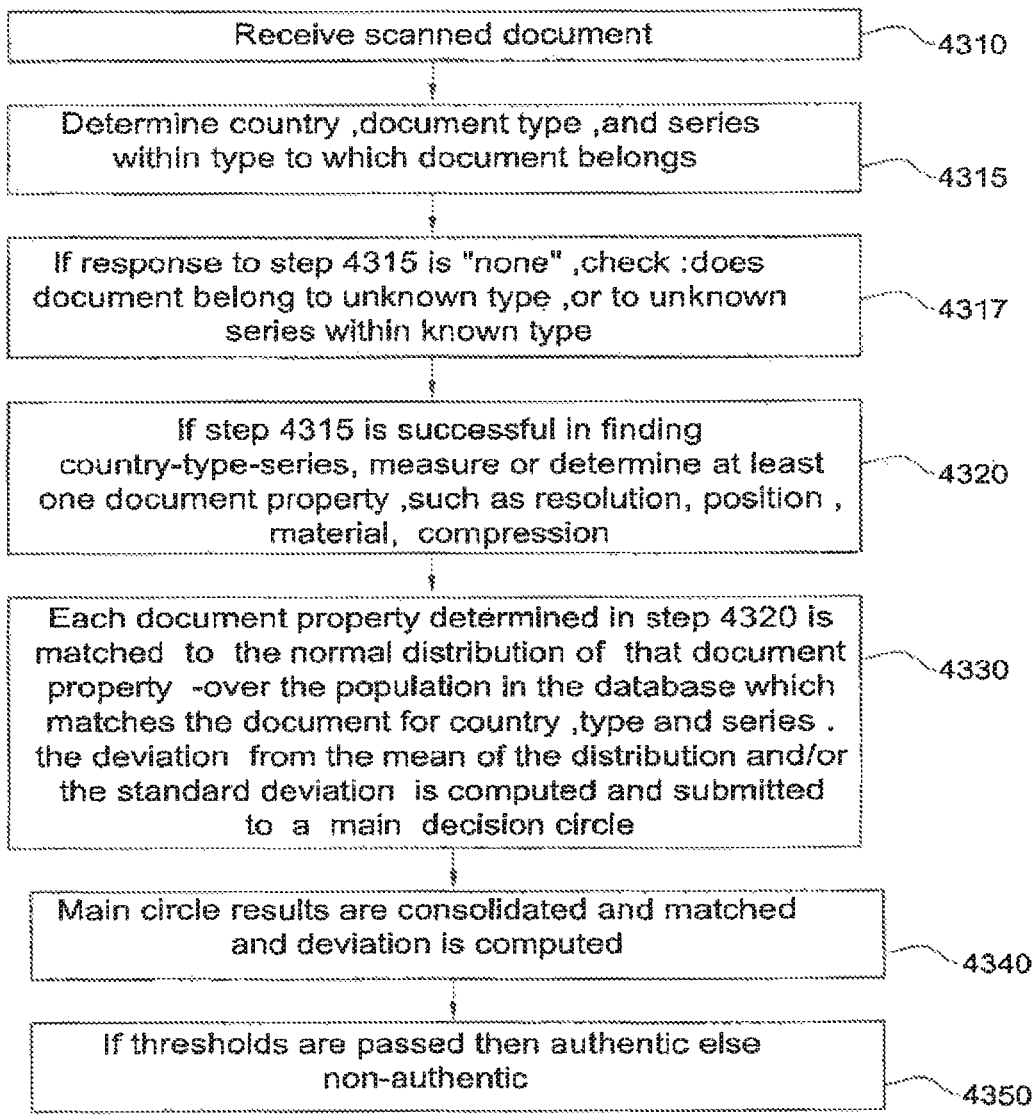
FIG. 31 is a simplified flowchart illustration of a method for generating an indication of whether or not a scanned document is authentic, according to certain embodiments of the present invention.

FIG. 31 is a simplified flowchart illustration of a method for generating an indication of whether or not a scanned document is authentic, according to certain embodiments of the present invention. The method of FIG. 31 typically includes some or all of the following steps, suitably ordered e.g. as shown:

Step 4310: receive scanned document

Step 4315: determine country, document type, and series within type to which document belongs Step 4317: if response to step 15 is "none", check: does document belong to unknown type, or to unknown series within known type Step 4320: if step 15 is successful in finding country-type-series, measure or determine at least one document property, such as resolution, position, material, compression Step 4330: each document property determined in step 20 is matched to the normal distribution of that document property—over the population in the database which matches the document for country, type and series. The deviation from the mean of the distribution and/or the standard deviation is computed and submitted to a main decision circle.

Step 4340: Main circle results are consolidated and matched and deviation is computed Step 4350: If thresholds are passed then authentic, otherwise are non-authentic.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order, electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof.

The invention claimed is:

1. A document forgery detection device comprising:
a processor configured for checking UV security patterns, for each of plural document types,
the device further comprising a database storing a plurality of templates each corresponding to an individual series of an individual type of document in an individual country thereby to define said plural document types, wherein templates are used to identify documents as belonging to known series within known document type stored in the database.

2. The device of claim 1 further an input device providing documents in which forgeries are to be detected, wherein said input device communicates via a cellular telephone network.

3. The device of claim 1 wherein each template used herein includes metadata defining commonalities of a type of document.

4. The device of claim 3 wherein said metadata includes location of at least one particular zone within the document, for a given type of document.

5. The device of claim 1 wherein templates are used to identify documents as belonging to a known series within a known document type stored in said database.

6. The device of claim 1, the device having an open software architecture to allow for enhancement including new templates.

7. The device of claim 1, the device having an open software architecture to allow for enhancement including additional fraud detection techniques.

8. The device of claim 1 wherein the device includes a document parser which uses the database to decide what the correct document type is; and
decide how to parse data in the document, once said document type has been correctly recognized.

9. The device of claim 1 wherein at least one template includes a stored indication of at least one UV illumination-related characteristic of a given series of a given document type in a given country.

10. The device of claim 1 wherein at least one check uses image processing techniques.

11. The device of claim 1 wherein said processor performs forgery detection which includes checking for existence of security patterns in a document printed in UV Fluorescent ink, that can be seen in the visual wavelength range when excited with UV radiation.

12. A document forgery detection method comprising:
providing a processor configured for checking UV security patterns, for each of plural document types,
the method further comprising providing a database storing a plurality of templates each corresponding to an individual series of an individual type of document in an individual country thereby to define said plural document types, wherein templates are used to identify documents as belonging to known series within known document type stored in the database.

13. The method of claim 12, further comprising generating a forgery detection output indication, according to a result of said checking.

14. The method of claim 13, wherein the method dynamically thresholds and/or generates a weighted combination of document properties including UV pattern properties to obtain an output characterizing each incoming document, thereby to provide said forgery detection output indication.

15. The method of claim 12 wherein said checking comprises checking at least one document of a specific document type, against a known UV pattern that is expected to appear in said specific document type.

16. The method of claim 12 wherein each UV pattern's location in the document is known.

17. The method of claim 12 wherein at least one pattern is formed by use of UV fluorescent ink in at least one document.

18. The method of claim 12, the method including comparison of a designated area/s in the UV image to a predefined UV pattern thereby to determine whether said predefined UV pattern is present in said area.

19. A computer program product, comprising a non-transitory tangible computer readable medium having computer readable program code embodied therein, said computer readable program code adapted to be executed to implement a document forgery detection method comprising checking UV security patterns, for each of plural document types,
the method further comprising accessing a database storing a plurality of templates each corresponding to an individual series of an individual type of document in an individual country thereby to define said plural document types, wherein templates are used to identify documents as belonging to known series within known document type stored in the database.

20. The product of claim 19 wherein at least one image of a document is analyzed to determine the document's authenticity based on at least checking for at least one UV pattern.

* * * * *